United States Patent
White et al.

(10) Patent No.: US 10,027,583 B2
(45) Date of Patent: Jul. 17, 2018

(54) CHAINED PACKET SEQUENCES IN A NETWORK ON A CHIP ARCHITECTURE

(71) Applicant: KnuEdge Incorporated, San Diego, CA (US)

(72) Inventors: Andrew White, Austin, TX (US); Douglas B. Meyer, San Diego, CA (US); Jerome V. Coffin, San Diego, CA (US)

(73) Assignee: KnuEdge Incorporated, San Diego, CA (US)

( * ) Notice: Subject to any disclaimer, the term of this patent is extended or adjusted under 35 U.S.C. 154(b) by 150 days.

(21) Appl. No.: 15/077,772

(22) Filed: Mar. 22, 2016

(65) Prior Publication Data
US 2017/0279714 A1    Sep. 28, 2017

(51) Int. Cl.
*H04L 12/741* (2013.01)
*H04L 12/801* (2013.01)

(52) U.S. Cl.
CPC .............. *H04L 45/74* (2013.01); *H04L 47/34* (2013.01)

(58) Field of Classification Search
CPC .................................. H04L 45/74; H04L 47/34
See application file for complete search history.

(56) References Cited

U.S. PATENT DOCUMENTS

| | | | |
|---|---|---|---|
| 4,797,652 A | 1/1989 | Hall | |
| 4,860,201 A | 8/1989 | Stolfo | |
| 4,974,169 A | 11/1990 | Engel | |
| 5,161,156 A | 11/1992 | Baum et al. | |
| 5,224,100 A | 6/1993 | Lee et al. | |
| 5,285,524 A | 2/1994 | Cok | |

(Continued)

FOREIGN PATENT DOCUMENTS

| | | |
|---|---|---|
| WO | WO1992002866 A1 | 2/1992 |
| WO | WO1993020552 A1 | 10/1993 |

(Continued)

OTHER PUBLICATIONS

Pumaprajna et al., "Using run-Time Reconfiguration for Energy Savings in Parallel Data Processing", Proceedings of the International Conference on Engineering of Reconfigurable Systems and Algorithms, Jul. 13, 2009, 7 pages.

*Primary Examiner* — Benjamin H Elliott, IV
(74) *Attorney, Agent, or Firm* — Fish & Richardson, P.C.

(57) ABSTRACT

Systems and techniques for network on a chip based computer architectures and communications therein are described. A described technique includes generating, at a first computing resource of a computer system, a chained packet sequence. A packet therein can specify a chain indicator to indicate inclusion in the chained packet sequence, a destination address, and an opcode. The technique includes routing the sequence to a second computing resource based on the destination address of a first chained packet in the sequence. The technique includes receiving the sequence at the second computing resource; performing the operation specified by the opcode of the first chained packet; and determining whether to process or forward one or more chained packets in a remainder portion of the sequence based on the destination address of a second chained packet of the sequence, the second chained packet being located at a beginning of the remainder portion.

25 Claims, 19 Drawing Sheets

(56) References Cited

U.S. PATENT DOCUMENTS

| | | |
|---|---|---|
| 5,325,464 A | 6/1994 | Pechanek et al. |
| 5,765,200 A | 6/1998 | McIlvain |
| 6,085,233 A | 7/2000 | Jeffrey et al. |
| 6,513,108 B1 | 1/2003 | Kerr |
| 6,735,773 B1 | 5/2004 | Trinh |
| 6,917,915 B2 | 7/2005 | Du et al. |
| 6,965,615 B1 | 11/2005 | Kerr |
| 7,215,637 B1 | 5/2007 | Ferguson |
| 7,401,169 B2 | 7/2008 | Holbrook |
| 7,685,409 B2 | 3/2010 | Du et al. |
| 7,746,862 B1 | 6/2010 | Zuk |
| 8,126,828 B2 | 2/2012 | Snook et al. |
| 8,484,307 B2 | 7/2013 | Arimilli |
| 8,583,648 B1 | 11/2013 | Majkowska |
| 8,655,815 B2 | 2/2014 | Palmer et al. |
| 8,848,726 B1 | 9/2014 | Palmer |
| 8,954,700 B2 | 2/2015 | Ansari et al. |
| 9,185,057 B2 | 11/2015 | Palmer et al. |
| 2002/0073348 A1 | 6/2002 | Tani |
| 2002/0083297 A1 | 6/2002 | Modelski et al. |
| 2003/0037194 A1 | 2/2003 | Mukherjee |
| 2003/0231627 A1 | 12/2003 | John |
| 2004/0030745 A1 | 2/2004 | Boucher et al. |
| 2004/0037322 A1 | 2/2004 | Sukonik |
| 2004/0098490 A1 | 5/2004 | Dinker |
| 2005/0204058 A1 | 9/2005 | Philbrick et al. |
| 2006/0010144 A1 | 1/2006 | Lawrence et al. |
| 2006/0023719 A1 | 2/2006 | Sindhu |
| 2007/0011118 A1 | 1/2007 | Snook et al. |
| 2007/0022063 A1 | 1/2007 | Lightowler |
| 2007/0121499 A1 | 5/2007 | Pal et al. |
| 2008/0077921 A1 | 3/2008 | Chaudhary |
| 2008/0215514 A1 | 9/2008 | Morgan |
| 2009/0216521 A1* | 8/2009 | Swoboda ......... G01R 31/31705 703/26 |
| 2010/0095088 A1 | 4/2010 | Vorbach |
| 2010/0161533 A1 | 6/2010 | Snook |
| 2010/0269027 A1 | 10/2010 | Arimilli |
| 2010/0312735 A1 | 12/2010 | Knoblauch |
| 2011/0083000 A1 | 4/2011 | Rhoades et al. |
| 2011/0161625 A1 | 6/2011 | Pechanek |
| 2011/0219035 A1 | 9/2011 | Korsunsky et al. |
| 2011/0261705 A1 | 10/2011 | Kamerkar |
| 2011/0289034 A1 | 11/2011 | Palmer et al. |
| 2011/0313961 A1 | 12/2011 | Toscano et al. |
| 2011/0317712 A1* | 12/2011 | Mejdrich ............ H04L 49/9047 370/412 |
| 2012/0066372 A1 | 3/2012 | Jennings et al. |
| 2012/0075319 A1 | 3/2012 | Daily |
| 2012/0177050 A1 | 7/2012 | Fujimoto |
| 2012/0179896 A1 | 7/2012 | Salapura |
| 2012/0240185 A1 | 9/2012 | Kapoor et al. |
| 2012/0320921 A1 | 12/2012 | Barnes et al. |
| 2013/0250954 A1 | 9/2013 | Sano |
| 2014/0032457 A1 | 1/2014 | Palmer et al. |
| 2014/0156907 A1 | 6/2014 | Palmer |
| 2014/0172763 A1 | 6/2014 | Palmer et al. |
| 2014/0281429 A1 | 9/2014 | Brown et al. |
| 2014/0304399 A1 | 10/2014 | Chaudhary |
| 2014/0310467 A1 | 10/2014 | Shalf et al. |
| 2015/0124805 A1 | 5/2015 | Yadav |
| 2015/0188987 A1* | 7/2015 | Reed .................. H04L 49/9042 709/201 |
| 2015/0347185 A1* | 12/2015 | Holt ....................... H04L 49/00 718/102 |
| 2017/0187613 A1* | 6/2017 | Kardashov ............ H04L 45/38 |
| 2017/0279714 A1* | 9/2017 | White .................... H04L 47/34 |

FOREIGN PATENT DOCUMENTS

| | | |
|---|---|---|
| WO | WO2004042570 A1 | 5/2004 |
| WO | WO2014062265 A1 | 4/2014 |
| WO | WO2014089259 A1 | 6/2014 |

* cited by examiner

| CHN B | PKT LEN | POP | Header | Dst Address |
|---|---|---|---|---|
| =1 | | | Payload (Start) | |
| | | | ⋮ | |
| | | | Payload (End) | |
| CHN B | PKT LEN | POP | Header | Dst Address |
| =1 | | | Payload (Start) | |
| | | | ⋮ | |
| | | | Payload (End) | |
| CHN B | PKT LEN | POP | Header | Dst Address |
| =0 | | | Payload (Start) | |
| | | | ⋮ | |
| | | | Payload (End) | |

CHAINED PACKET SEQUENCES IN A NETWORK ON A CHIP ARCHITECTURE

FIELD OF THE DISCLOSURE

The systems, methods, and apparatuses described herein relate to reading from memory in a computing system that has a plurality of computing resources, where communications among the computing resources are carried out based on a network on a chip architecture.

BACKGROUND

A computing system includes multiple computing resources, at least some of which communicate with each other based on a network on a chip architecture. The computing resources include processing elements (or engines), memories, and the like. Data processed by a processing element can be stored by the processing element, in part remotely, in a memory of the computing system, and, in part locally, in memory registers of the processing element. Often, the processing element combines the items of processed data stored in the memory with the items of processed data stored in the memory registers and then sends the combined processed data items to another processing element for further processing (e.g., as part of a software pipeline).

This is conventionally accomplished by the processing element by performing the following sequence of operations: a first portion of the processed data to be sent to the other processing element is first retrieved from the memory and then placed into memory registers contiguous with the memory registers already holding a second portion of the processed data to be sent to the other processing element. Upon placement of the retrieved first portion of the processed data in the contiguous registers, the processing element transmits the combined processed data to the other processing element for further processing.

SUMMARY

Systems and techniques for network on a chip based computer architectures and communications therein are disclosed. In one aspect of the disclosed technologies, a technique includes generating, at a first computing resource of a computer system, a chained packet sequence. Each packet in the chained packet sequence can specify a chain indicator to indicate inclusion in the chained packet sequence, a destination address, and an opcode that specifies an operation to be performed by a computing resource associated with the destination address. The technique includes routing, at a router of the computer system, the chained packet sequence to a second computing resource based on the destination address of a first chained packet in the chained packet sequence, the destination address of the first chained packet being associated with the second computing resource. The technique includes receiving, at the second computing resource of the computer system, the chained packet sequence; performing, at the second computing resource, the operation specified by the opcode of the first chained packet; and determining, at the second computing resource, whether to process or forward one or more chained packets in a remainder portion of the chained packet sequence based on the destination address of a second chained packet of the chained packet sequence, the second chained packet being located at a beginning of the remainder portion.

These and other implementations can include one or more of the following features. In some implementations, the chain indicator can include a bit field to indicate whether a subsequent packet is part of the chained packet sequence. In some implementations, the chain indicator can include a chain length field to indicate a length of the chained packet sequence. The indicated length can correspond to a quantity of packets in the chained packet sequence. In some implementations, at least one packet of the chained packet sequence can include a barrier indicator to indicate whether processing of one or more packets in the chained packet sequence is to be completed before processing a subsequent portion of the chained packet sequence. In some implementations, the first chained packet can include data, and the opcode of the first chained packet specifies a write of the data to memory associated with the second computing resource. The second chained packet can be configured to notify a notification target computing resource of the computer system about a completion of the write of the data. In some implementations, the opcode of the first chained packet specifies a read of first data from a first memory of the computer system based on a first memory address, and the opcode of the second chained packet specifies a read of second data from a second memory of the computer system based on a second memory address. In some implementations, the first memory address forms a portion of the destination address of the first chained packet, and the second memory address forms a portion of the destination address of the second chained packet. Implementations can include generating a first response packet based on the first data; generating a second response packet based on the second data; generating a chained sequence of response packets that comprise the first response packet and the second response packet; and sending the chained sequence of response packets to a destination computing resource of the computer system.

In another aspect, an apparatus can include computing resources including a first computing resource and a second computing resource; and a router to communicatively couple the first computing resource and the second computing resource. The first computing resource can be configured to generate a chained packet sequence. Each packet in the chained packet sequence specifies a chain indicator to indicate inclusion in the chained packet sequence, a destination address, and an opcode that specifies an operation to be performed by a computing resource associated with the destination address. The router can be configured to route the chained packet sequence to the second computing resource based on the destination address of a first chained packet in the chained packet sequence, the destination address of the first chained packet being associated with the second computing resource. The second computing resource can be configured to receive the chained packet sequence, perform the operation specified by the opcode of the first chained packet, and determine whether to process or forward one or more chained packets in a remainder portion of the chained packet sequence based on the destination address of a second chained packet of the chained packet sequence, and the second chained packet being located at a beginning of the remainder portion.

These and other implementations can include one or more of the following features. The chain indicator can include a bit field to indicate whether a subsequent packet is part of the chained packet sequence. The chain indicator can include a chain length field to indicate a length of the chained packet sequence. In some implementations, the indicated length corresponds to a quantity of packets in the chained packet sequence. In some implementations, at least one packet of the chained packet sequence can include a barrier indicator to indicate whether processing of one or more packets in the chained packet sequence is to be completed before processing a subsequent portion of the chained packet sequence. In some implementations, the first chained packet can include data, and the opcode of the first chained packet specifies a write of the data to memory associated with the second computing resource. In some implementations, the second chained packet is configured to notify a notification target computing resource of the apparatus about a completion of the write of the data. In some implementations, the opcode of the first chained packet specifies a read of first data from a first memory of the apparatus based on a first memory address, and the opcode of the second chained packet specifies a read of second data from a second memory of the apparatus based on a second memory address. In some implementations, the first memory address forms a portion of the destination address of the first chained packet, and the second memory address forms a portion of the destination address of the second chained packet. A computing resource configured to generate a first response packet based on the first data, generate a second response packet based on the second data, generate a chained sequence of response packets that comprise the first response packet and the second response packet, and send the chained sequence of response packets to a destination computing resource of the apparatus.

In another aspect, a system can include a plurality of computing resources; a plurality of memories associated with respective ones of the computing resources; and a router to communicatively couple at least a portion of the computing resources. The router can be configured to receive a chained packet sequence from a first computing resource of the computing resources. The chained packet sequence can include at least one chain indicator to identify packets belonging in the chained packet sequence. Each packet in the chained packet sequence can specify a destination address, and an opcode that specifies an operation to be performed by a computing resource associated with the destination address. The router can be configured to route the chained packet sequence to a second computing resource of the computing resources based on the destination address of a first chained packet in the chained packet sequence, the destination address of the first chained packet being associated with the second computing resource. The second computing resource can be configured to receive the chained packet sequence, perform the operation specified by the opcode of the first chained packet, and determine whether to process or forward one or more chained packets in a remainder portion of the chained packet sequence based on the destination address of a second chained packet of the chained packet sequence, and the second chained packet being located at a beginning of the remainder portion.

In some implementations, the chain indicator can include a chain length field to indicate a length of the chained packet sequence. In some implementations, the opcode of the first chained packet specifies a read of first data from a first memory of the memories based on a first memory address, and the opcode of the second chained packet specifies a read of second data from a second memory of the memories based on a second memory address. In some implementations, the first memory address forms a portion of the destination address of the first chained packet, and the second memory address forms a portion of the destination address of the second chained packet. In some implementations, the first chained packet can include data, and the opcode of the first chained packet specifies a write of the data to memory associated with the second computing resource. In some implementations, the second chained packet is configured to notify a notification target computing resource of the system about a completion of the write of the data.

Particular aspects of the disclosed technologies can be implemented so as to realize one or more of the following potential advantages. When compared to sending separate packets, sending a chained packet sequence can increase overall network performance for a network on a chip architecture. For example, a chained packet sequence can increase bandwidth and reduce latency. Further, router processing overhead can be reduced. For example, the routing determination for a chained packet sequence can be based on extracting a destination address from a beginning packet of the sequence rather than extracting all of the destination addresses from the sequence. The sequencing of packets within the chained packet sequence can provide synchronization. Further, the sequencing of packets can obviate the requirement for a global counter to synchronize write or read operations. One or more described computer systems can provide flexibility to meet programming requirements. For example, separate packets, chained packet sequences, or both can be used based on the programming requirements.

Details of one or more implementations of the disclosed technologies are set forth in the accompanying drawings and the description below. Other features, aspects, descriptions and potential advantages will become apparent from the description, the drawings, and the claims.

BRIEF DESCRIPTION OF THE DRAWINGS

FIG. 10 shows a format of an example of a chained packet sequence including barrier indicators in respective packet headers.

DETAILED DESCRIPTION

Figure 1:
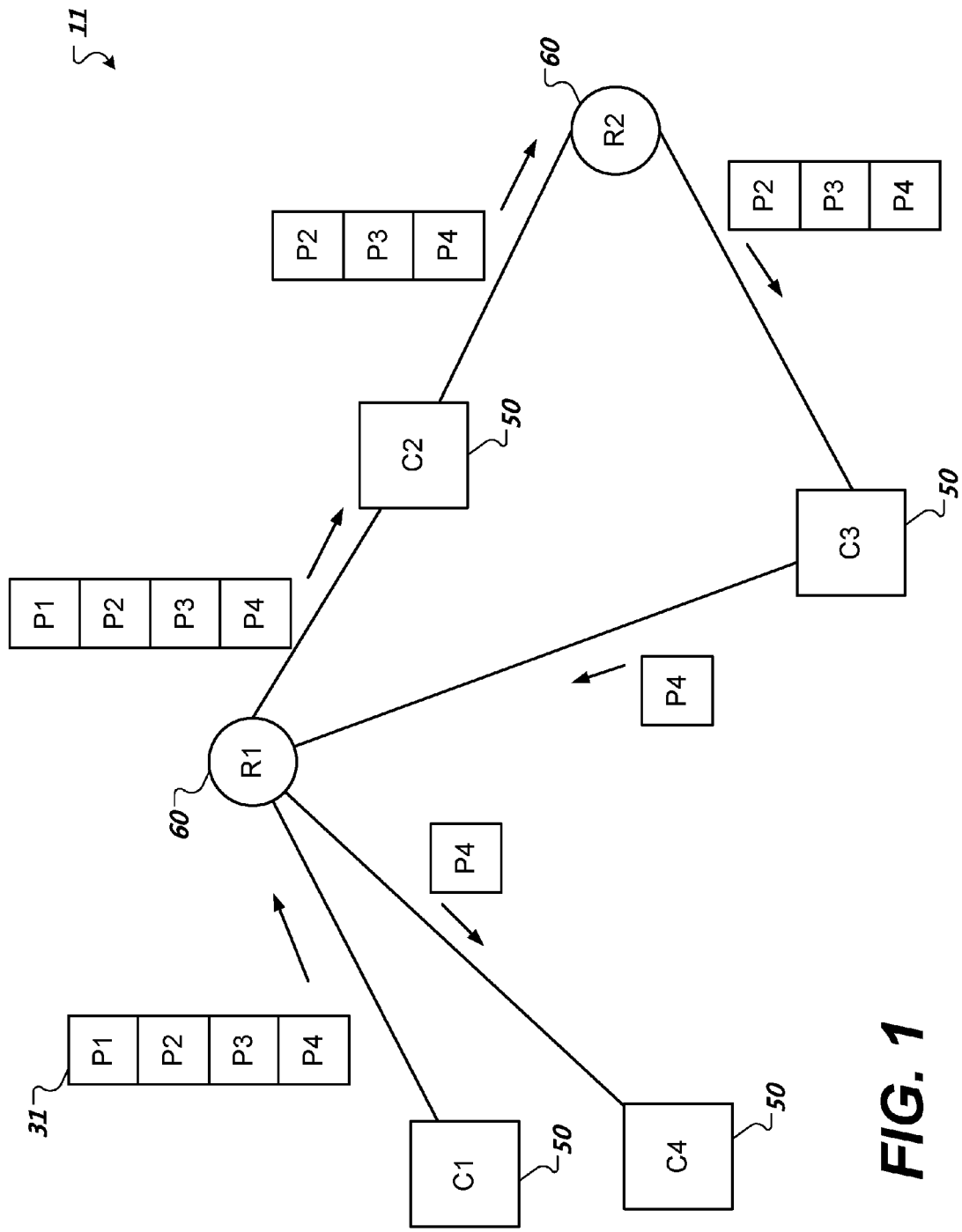
FIG. 1 shows an example of a progression of a chained packet sequence within a network on a chip based computer system.

FIG. 1 shows an example of a progression of a chained packet sequence 31 within a network on a chip based computer system 11. The computer system 11 includes computing resources 50 (labeled C1, C2, C3, and C4) and routers 60 (labeled R1 and R2). In some implementations, the computing resources 50 and routers 60 are formed on a single integrated circuit. In some implementations, the computing resources 50 and routers 60 are formed on two or more integrated circuits. The computing resources 50 can include circuitry such as general purpose processors, digital signal processors (DSPs), specialized logic, or a combination thereof.

The computing resources 50 can exchange data via packets. For example, one computing resource 50 can generate data and send the data via a packet to another computing resource 50 within the computer system 11. Packets can be exchanged for various reasons including to read data from a remote location, write data to a remote location, and other reasons such as notification and synchronization among the computing resources 50. In some implementations, the communications among the computing resources 50 and routers 60 are asynchronous.

The routers 60 can be configured to route packets within the computer system 11 based on a destination address within a packet header. A computing resource 50 can group two or more packets (labeled P1, P2, P3, and P4) together to form a chained packet sequence 31. Thus, the routers 60 can be further configured to route the chained packet sequence 31 within the computer system 11. While packets forming the chained packet sequence 31 can be viewed as separate, standalone packets, grouping them together can increase network bandwidth and efficiency. A chain indicator within the header of each packet of the chained packet sequence 31 can be used to signal the fact that the packets belong to a particular sequence. Packets within the sequence 31 can be addressed to different destinations. However, based on a chained packet sequence detection, the router 60 can use the destination address in the beginning packet of the sequence 31 for routing purposes.

Once received and identified as being associated with C2, the C2 computing resource 50 extracts the beginning packet from the chained packet sequence 31 and performs the operation indicated by an opcode within the header of the beginning packet. The C2 computing resource 50 can extract one or more additional packets from the sequence 31 that are associated with C2 and can process them accordingly. After removing the one or more extracted packets to form a modified version of the chained packet sequence 31, the C2 computing resource 50 can send the modified version of the chained packet sequence 31 to the router 60. The router 60 can route the modified version of the chained packet sequence 31 to the next computing resource 50 associated with the beginning packet of the modified version. The process of extracting and processing packets, and forwarding remaining packets can continue until there are no more packets left within the chained packet sequence 31.

The use of packet chaining within the computer system 11 can provide synchronization among the computing resources 50. For example, when a computing resource 50 needs to write data to a cluster memory (described in greater detail below), and have another computing resource 50 process that data, a previous computer system may require that the writing computing resource 50 read the data back from memory (e.g., a read-back) to confirm a successful write before sending a notification packet to the subsequent computing resource 50 to start fetching and/or processing the written data. However, packet chaining can avoid a read-back operation, and reduce latency by chaining a notification packet to the write packet. A computing resource 50 can chain the write packet together with the notification packet and have both sent to the cluster memory together. A cluster memory controller writes the data to the memory, and forwards the remaining packet(s), including the notification packet, to the destination specified by the notification packet.

Further, the use of packet chaining within the computer system 11 provides packet aggregation, which can in turn increase bandwidth. Transmitting small, separate packets may reduce network performance for asynchronous networks. Chaining packets together can improve use of available bandwidth. Further, chaining packets can reduce router overhead. Moreover, packet chaining can improve the performance of scatter/gather operations. For example, if a computing resource 50 needs to read from a number of locations in a (non-local) cluster memory, the computing resource 50 can chain together a number of packets to read from those locations. A cluster memory controller can create and send a chain of response packets based on the packets within the received chain. In some implementations, packet chaining can allow packet delivery to be ordered without having to use other synchronization mechanisms that may be more expensive and/or complex to use.

Figure 2A:
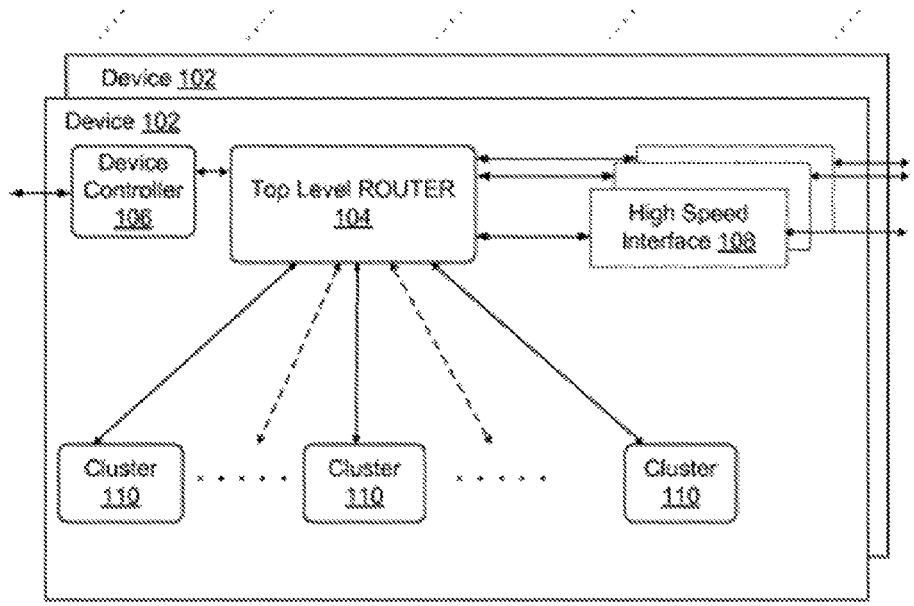
FIGS. 2A and 2B show a block diagram of different examples of a computing system.

FIG. 2A shows a block diagram of an example of a computing system 200. The computing system 200 includes computing resources such as processing devices 102. In some implementations, each processing device 102, which may also be referred to as device 102, includes a router 104, a device controller 106, a plurality of high speed interfaces 108 and a plurality of clusters 110. The router 104 may also be referred to as a top level router or a level one router. Each cluster 110 includes computing resources such as a plurality of processing engines to provide computational capabilities for the computing system 200. In some implementations, the high speed interfaces 108 include communication ports to communicate data outside of the device 102, for example, to other devices 102 of the computing system 200 and/or interfaces to other computing systems. Unless specifically expressed otherwise, data as used herein may refer to both program code and pieces of information upon which the program code operates.

In some implementations, the processing device 102 includes 2, 4, 8, 16, 32 or another number of high speed interfaces 108. Each high speed interface 108 may implement a physical communication protocol. For example, each high speed interface 108 implements the media access control (MAC) protocol, and thus may have a unique MAC address associated with it. The physical communication may be implemented in a known communication technology, for example, Gigabit Ethernet, or any other existing or future-developed communication technology. For example, each high speed interface 108 implements bi-directional high-speed serial ports, such as 10 Gigabits per second (Gbps) serial ports. Two processing devices 102 implementing such high speed interfaces 108 may be directly coupled via one pair or multiple pairs of the high speed interfaces 108, with each pair including one high speed interface 108 on one processing device 102 and another high speed interface 108 on the other processing device 102.

In accordance with a network on a chip architecture, data communication among different computing resources of the computing system 200 is implemented using routable packets. A packet can include a header. A packet can further include a payload following the header. A packet header can include a routable destination address for the packet. The computing resources can include device level resources such as a device controller 106, cluster level resources such as a cluster controller or cluster memory controller, and/or the processing engine level resources such as individual processing engines and/or individual processing engine memory controllers. The router 104 may be a top-most router configured to route packets on each processing device 102. In some implementations, the router 104 is a programmable router. That is, the routing information used by the router 104 may be programmed and updated. In some cases, the router 104 is implemented using an address resolution table (ART) or look-up table (LUT) to route any packet it receives on the high speed interfaces 108, or any of the internal interfaces interfacing the device controller 106 or clusters 110. For example, depending on the destination address, a packet received from one cluster 110 may be routed to a different cluster 110 on the same processing device 102, or to a different processing device 102; and a packet received from one high speed interface 108 may be routed to a cluster 110 on the processing device or to a different processing device 102.

In some implementations, the device controller 106 controls the operation of the processing device 102 from power on through power down. In some implementations, the device controller 106 includes a device controller processor, one or more registers and a device controller memory space. The device controller processor may be any existing or future-developed microcontroller. In some implementations, for example, an ARM® Cortex M0 microcontroller is used for its small footprint and low power consumption. In other implementations, a bigger and more powerful microcontroller is chosen if needed. The one or more registers include one to hold a device identifier (DEVID) for the processing device 102 after the processing device 102 is powered up. The DEVID is used to uniquely identify the processing device 102 in the computing system 200. In some implementations, the DEVID is loaded on system start from a non-volatile storage, for example, a non-volatile internal storage on the processing device 102 or a non-volatile external storage. The device controller memory space may include both read-only memory (ROM) and random access memory (RAM). In some implementations, the ROM may store bootloader code that during a system start is executed to initialize the processing device 102 and load the remainder of the boot code through a bus from outside of the device controller 106. In some implementations, the instructions for the device controller processor, also referred to as the firmware, reside in the RAM after they are loaded during the system start.

Here, the registers and device controller memory space of the device controller 106 are read and written to by computing resources of the computing system 200 using packets. That is, they are addressable using packets. As used herein, the term "memory" may refer to RAM, SRAM, DRAM, eDRAM, SDRAM, volatile memory, non-volatile memory, and/or other types of electronic memory. For example, the header of a packet includes a destination address such as DEVID:PADDR, of which the DEVID may identify the processing device 102 and the PADDR may be an address for a register of the device controller 106 or a memory location of the device controller memory space of a processing device 102. In some implementations, a packet directed to the device controller 106 has a packet operation code, which may be referred to as packet opcode or just opcode, to indicate what operation needs to be performed for the packet. For example, the packet operation code may indicate reading from or writing to the storage location pointed to by PADDR. It should be noted that the device controller 106 also sends packets in addition to receiving them. The packets sent by the device controller 106 may be self-initiated or in response to a received packet (e.g., a read request). Self-initiated packets include, for example, reporting status information, requesting data, etc.

Figure 2B:
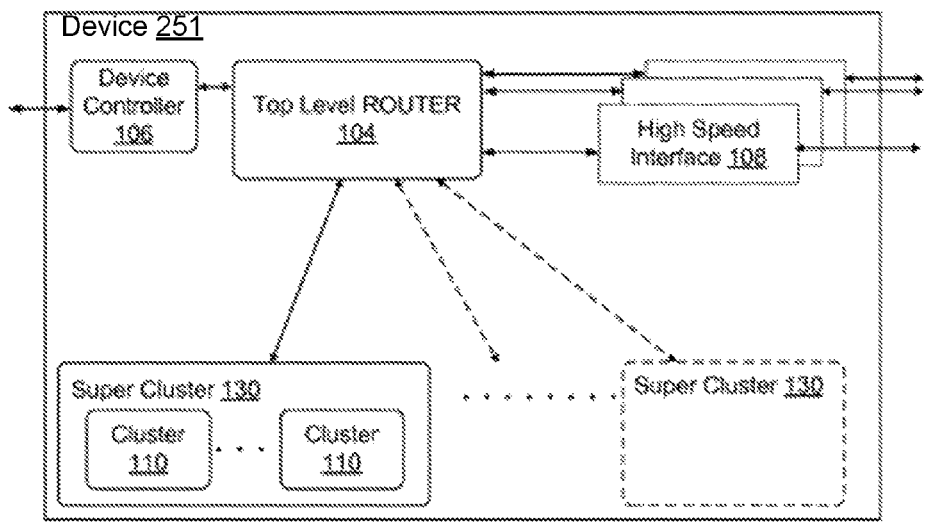

FIG. 2B shows a block diagram of an example of a computing system 250 having a group of clusters 110 on a processing device 251 that are grouped together into super clusters 130. The processing device 251 can include a device controller 106, a router 104, high speed interface 108, and a plurality of clusters 110. The clusters 110 can be grouped together to form a super cluster 130. In this example, the processing device 251 includes a plurality of such super clusters 130. In some implementations, a processing device 251 may include 2, 4, 8, 16, 32 or another number of super clusters 130 and each super cluster 130 may comprise a plurality of clusters.

Figure 3A:
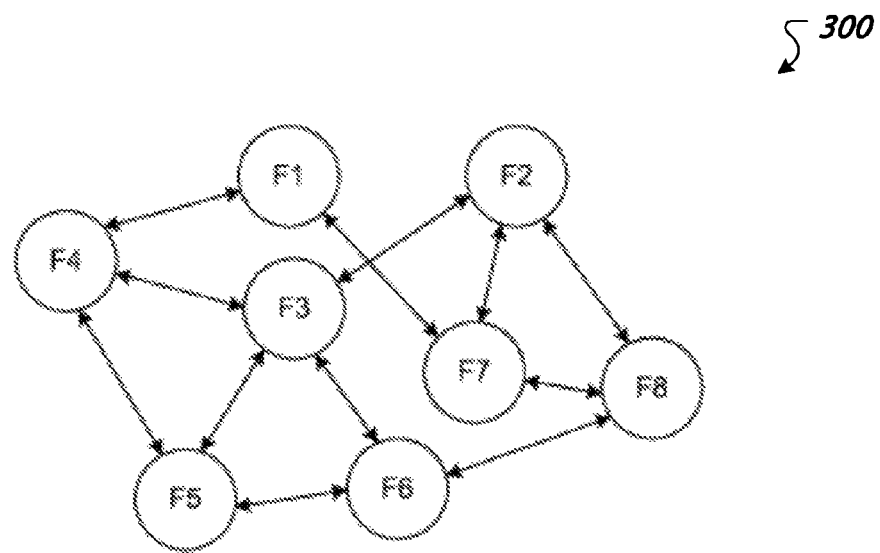
FIGS. 3A and 3B show a topology of different examples of a computing system.

FIG. 3A shows a topology of an example of a computing system 300. The computing system 300 includes a plurality of processing devices 102 designated as F1, F2, F3, F4, F5, F6, F7 and F8. As shown in FIG. 3A, each processing device 102 is directly coupled to one or more other processing devices 102. For example, F4 is directly coupled to F1, F3 and F5; and F7 is directly coupled to F1, F2 and F8. Within computing system 300, one of the processing devices 102 may function as a host for the whole computing system 300. In some implementations, the host has a unique device ID that every processing devices 102 in the computing system 300 recognizes as the host. Any of the processing devices 102 may be designated as the host for the computing system 300. For example, F1 may be designated as the host and the device ID for F1 is set as the unique device ID for the host. In some implementations, the host is a processing device of a different type. The host can communicate with the rest of the system 300 through a communication interface, which represents itself to the rest of the system 300 as the host by having a device ID for the host.

The computing system 300 may implement any appropriate techniques to set the DEVIDs, including the unique DEVID for the host, to the respective processing devices 102 of the computing system 300. In some implementations, the DEVIDs are stored in the ROM of the respective device controller 106 for each processing devices 102 and loaded into a register for the device controller 106 at power up. In other implementations, the DEVIDs are loaded from an external storage. Here, the assignments of DEVIDs may be performed offline (when there is no application running in the computing system 300), and may be changed offline from time to time or as appropriate. Thus, the DEVIDs for one or more processing devices 102 may be different each time the computing system 300 initializes. Moreover, the DEVIDs stored in the registers for each device controller 106 may be changed at runtime. This runtime change is controlled by the host of the computing system 300. For example, after the initialization of the computing system 300, which loads the pre-configured DEVIDs from ROM or external storage, the host of the computing system 300 may reconfigure the computing system 300 and assign different DEVIDs to the processing devices 102 in the computing system 300 to overwrite the initial DEVIDs in the registers of the device controllers 106.

Figure 3B:
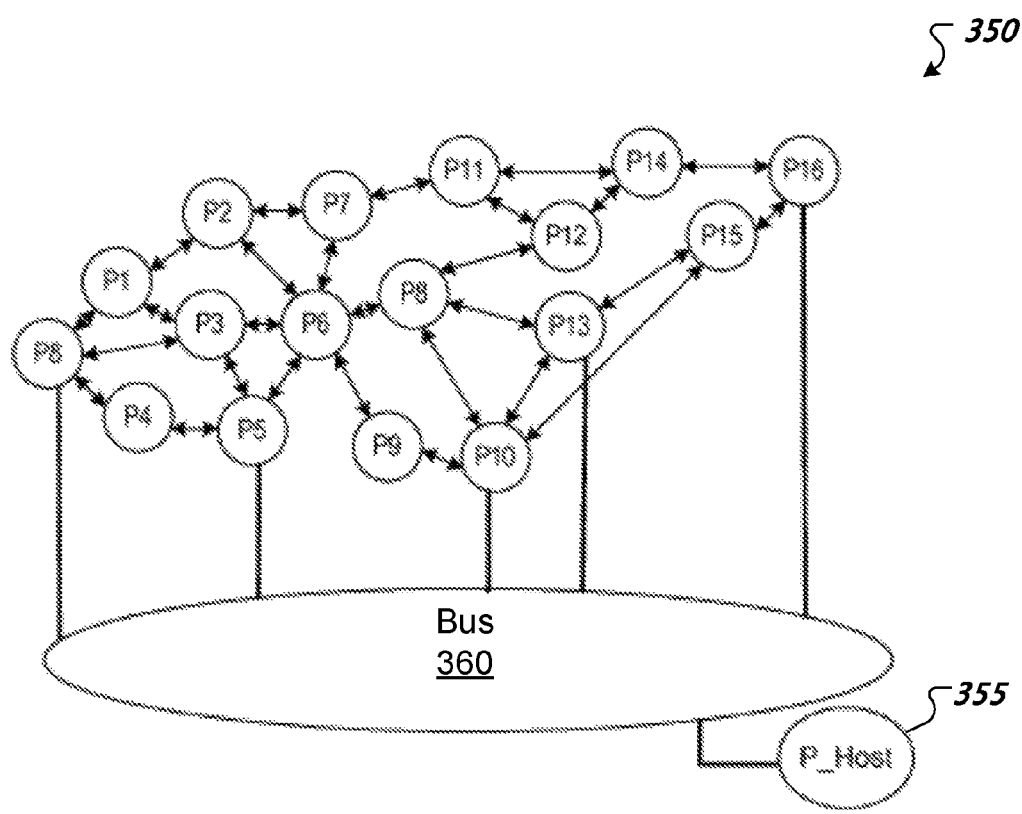

FIG. 3B shows a topology of another example of a computing system 350. The computing system 350 includes a plurality of processing devices 102 (designated as P1 through P16), a bus 360 and a host processing device 355. Each processing device of P1 through P16 is directly coupled to another processing device of P1 through P16 by a direct link between them. At least one of the processing devices P1 through P16 is coupled to the bus 360. In the example shown in FIG. 3B, the processing devices P8, P5, P10, P13, P15 and P16 are coupled to the bus 360. Here, the host processing device 355 is coupled to the bus 360 and is designated as the host for the computing system 350. In the computing system 350, the host processing device 355 may be a computer processor (for example, an ARM® Cortex or Intel® x86 processor). The host processing device communicates with the rest of the computing system 350 through a communication interface coupled to the bus and represents itself to the rest of the system 350 as the host by having a device ID for the host.

Figure 4:
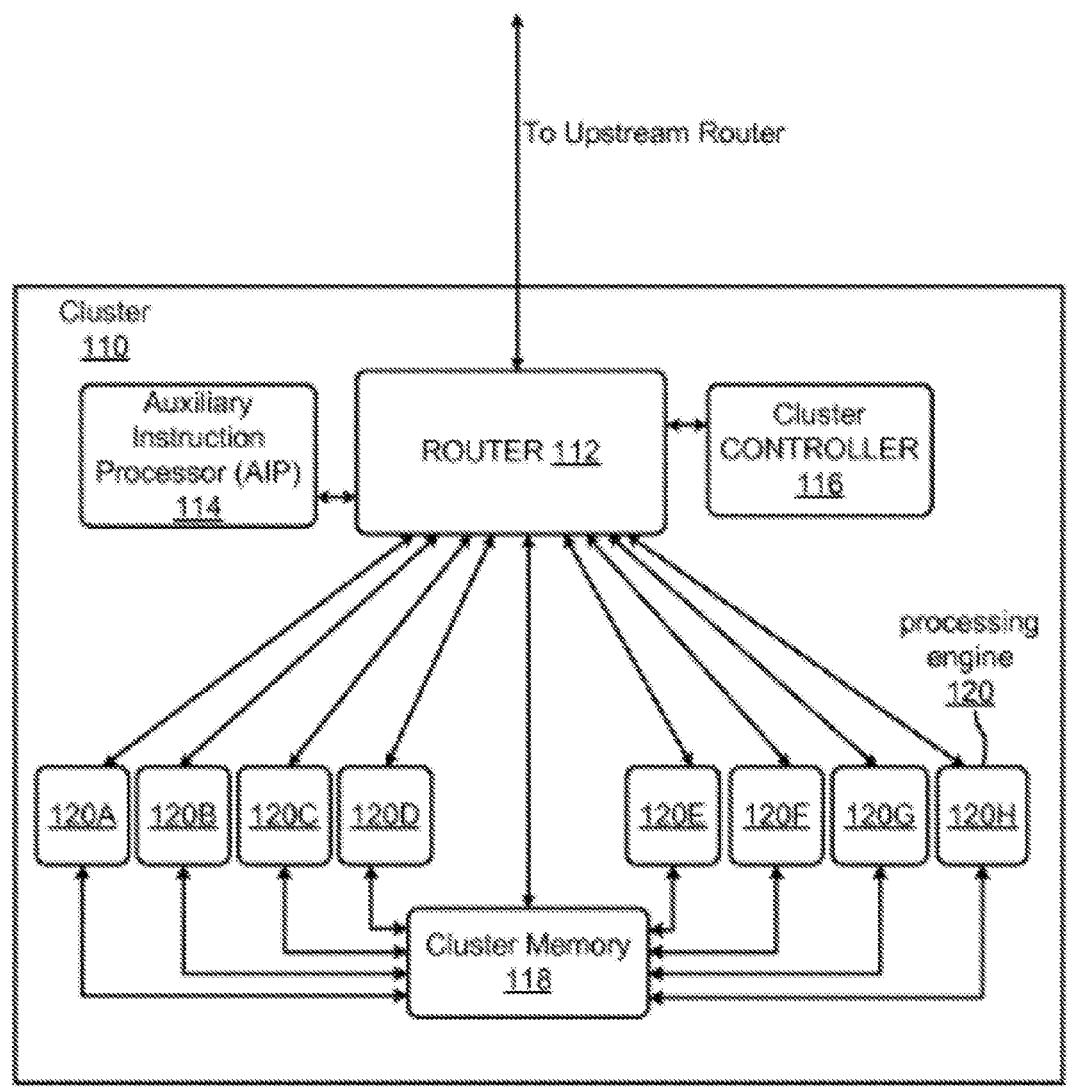
FIG. 4 shows a block diagram of an example of a cluster of the processing device of FIG. 2A.

FIG. 4 shows a block diagram of an example of a cluster 110 of the processing device 102 of FIG. 2A. The cluster 110 includes a router 112, a cluster controller 116, an auxiliary instruction processor (AIP) 114, a cluster memory 118, and a plurality of processing engines 120. The router 112 is coupled to an upstream router to provide interconnection between the upstream router and the cluster 110. The upstream router may be, for example, the router 104 of the processing device 102 if the cluster 110 is not part of a super cluster 130.

In accordance with network on a chip architecture, examples of operations to be performed by the router 112 include receiving a packet destined for a computing resource within the cluster 110 from outside the cluster 110 and/or transmitting a packet originating within the cluster 110 destined for a computing resource inside or outside the cluster 110. A computing resource within the cluster 110 may be, for example, the cluster memory 118 or any of the processing engines 120 within the cluster 110. A computing resource outside the cluster 110 may be, for example, a computing resource in another cluster 110 of the processing device 102, the device controller 106 of the processing device 102, or a computing resource on another processing device 102. In some implementations, the router 112 also transmits a packet to the router 104 even if the packet may target a resource within itself. In some cases, the router 104 implements a loopback path to send the packet back to the originating cluster 110 if the destination resource is within the cluster 110.

In some implementations, the cluster controller 116 sends packets, for example, as a response to a read request, or as unsolicited data sent by hardware for error or status report. The cluster controller 116 also receives packets, for example, packets with opcodes to read or write data. In some implementations, the cluster controller 116 is a microcontroller, for example, one of the ARM® Cortex-M microcontrollers and includes one or more cluster control registers (CCRs) that provide configuration and control of the cluster 110. In other implementations, instead of using a microcontroller, the cluster controller 116 is custom made to implement any functionalities for handling packets and controlling operation of the router 112. Here, the functionalities may be referred to as custom logic and may be implemented, for example, by FPGA or other specialized circuitry. Regardless of whether it is a microcontroller or implemented by custom logic, the cluster controller 116 may implement a fixed-purpose state machine encapsulating packets and memory access to the CCRs.

In some implementations, each cluster memory 118 is part of the overall addressable memory of the computing system 200. That is, the addressable memory of the computing system 200 includes the cluster memories 118 of all clusters 110 of all devices 102 of the computing system 200. The cluster memory 118 is a part of the main memory shared by the computing system 200. In some implementations, any memory location within the cluster memory 118 may be addressed by any processing engine within the computing system 200 by a physical address. In some implementations, the physical address is a combination of the DEVID, a cluster identifier (CLSID) and a physical address location (PADDR) within the cluster memory 118. As such, the physical address is formed as a string of bits, e.g., DEVID:CLSID:PADDR. The DEVID may be associated with the device controller 106 as described above and the CLSID may be a unique identifier to uniquely identify the cluster 110 within the local processing device 102. It should be noted that in at least some implementations, each register of the cluster controller 116 also be assigned a physical address (PADDR). Therefore, the physical address DEVID:CLSID:PADDR may also be used to address a register of the cluster controller 116, in which PADDR may be an address assigned to the register of the cluster controller 116.

In some other implementations, any memory location within the cluster memory 118 is addressed by any processing engine within the computing system 200 by a virtual address. The virtual address may be a combination of a DEVID, a CLSID and a virtual address location (ADDR). As such, the virtual address is formed as a string of bits, e.g., DEVID:CLSID:ADDR. The DEVID and CLSID in the virtual address may be the same as in the physical addresses.

In some cases, the width of ADDR is specified by system configuration. For example, the width of ADDR is loaded into a storage location convenient to the cluster memory 118 during system start and/or changed from time to time when the computing system 200 performs a system configuration. In some implementations, to convert the virtual address to a physical address, the value of ADDR is added to a base physical address value (BASE). The BASE may also be specified by system configuration as the width of ADDR and stored in a location convenient to a memory controller of the cluster memory 118. In one example, the width of ADDR is stored in a first register and the BASE is stored in a second register in the memory controller. Thus, the virtual address DEVID:CLSID:ADDR is converted to a physical address as DEVID:CLSID:ADDR+BASE. Note that the result of ADDR+BASE has the same width as the target physical address.

The address in the computing system 200 may be 8 bits, 16 bits, 32 bits, 64 bits, or any other number of bits wide. In some implementations, the address is 32 bits wide. The DEVID may be 10, 15, 20, 25 or any other number of bits wide. The width of the DEVID is chosen based on the size of the computing system 200, for example, how many processing devices 102 the computing system 200 has or is designed to have. In some implementations, the DEVID is 20 bits wide and the computing system 200 using this width of DEVID contains up to $2^{20}$ processing devices 102. The width of the CLSID is chosen based on how many clusters 110 the processing device 102 is designed to have. For example, the CLSID may be 3, 4, 5, 6, 7, 8 bits or any other number of bits wide. In some implementations, the CLSID is 5 bits wide and the processing device 102 using this width of CLSID contains up to $2^5$ clusters. The width of the PADDR for the cluster level may be 20, 30 or any other number of bits. For example, the PADDR for the cluster level is 27 bits and the cluster 110 using this width of PADDR contains up to $2^{27}$ memory locations and/or addressable registers. Therefore, in some implementations, if the DEVID is 20 bits wide, CLSID is 5 bits and PADDR has a width of 27 bits, then a physical address DEVID:CLSID:PADDR or DEVID:CLSID:ADDR+BASE is 52 bits.

For performing the virtual to physical memory conversion, the first register (ADDR register) may have 4, 5, 6, 7 bits or any other number of bits. In some implementations, the first register is 5 bits wide. If the value of the 5 bits register is four (4), the width of ADDR is 4 bits; and if the value of 5 bits register is eight (8), the width of ADDR will be 8 bits. Regardless of ADDR being 4 bits or 8 bits wide, if the PADDR for the cluster level is 27 bits, then BASE is 27 bits, and the result of ADDR+BASE still is a 27 bits physical address within the cluster memory 118.

In the example illustrated in FIG. 4, a cluster 110 includes one cluster memory 118. In other examples, a cluster 110 includes a plurality of cluster memories 118 that each includes a memory controller and a plurality of memory banks, respectively. Moreover, in yet another example, a cluster 110 includes a plurality of cluster memories 118 and these cluster memories 118 are connected together via a router that are downstream of the router 112.

The AIP 114 is a special processing engine shared by all processing engines 120 of one cluster 110. In some implementations, the AIP 114 is implemented as a coprocessor to the processing engines 120. For example, the AIP 114 implements less commonly used instructions such as some floating point arithmetic, including but not limited to, one or more of addition, subtraction, multiplication, division and square root, etc. In the example shown in FIG. 4, the AIP 114 is coupled to the router 112 directly and is configured to send and receive packets via the router 112. As a coprocessor to the processing engines 120 within the same cluster 110, although not shown in FIG. 4, the AIP 114 may also be coupled to each processing engines 120 within the same cluster 110 directly. In other implementations, a bus shared by all the processing engines 120 within the same cluster 110 is used for communication between the AIP 114 and all the processing engines 120 within the same cluster 110. In some other implementations, a multiplexer is used to control access to the bus shared by all the processing engines 120 within the same cluster 110 for communication with the AIP 114. In yet other implementations, a multiplexer is used to control communication between the AIP 114 and all the processing engines 120 within the same cluster 110.

Figure 5:
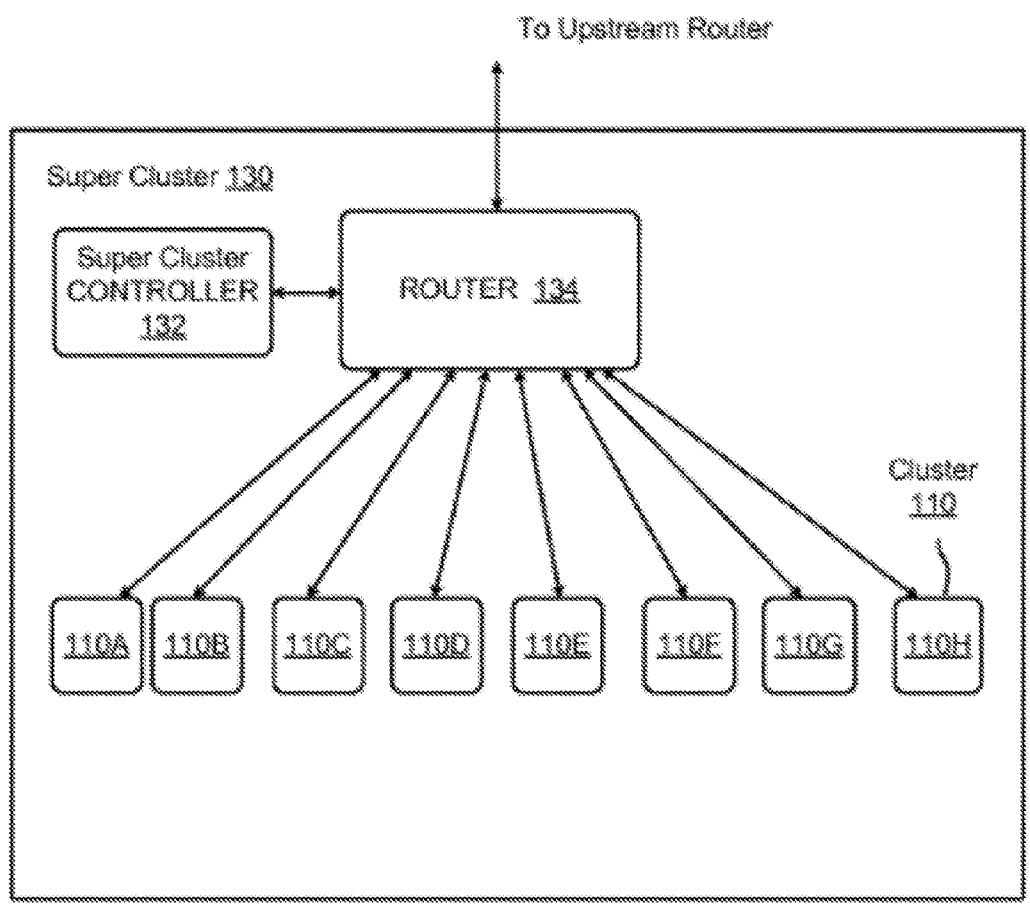
FIG. 5 shows a block diagram of an example of a super cluster of the processing device of FIG. 2B.

FIG. 5 shows a block diagram of an example of a super cluster 130 of the processing device 251 of FIG. 2B. The grouping of the processing engines 120 on a processing device 251 may have a hierarchy with multiple levels. For example, multiple clusters 110 are grouped together to form a super cluster. In the example shown in FIG. 5, a plurality of clusters 110A through 110H are grouped into the super cluster 130. Although 8 clusters are shown in the super cluster 130 on FIG. 5, the super cluster 130 may include 2, 4, 8, 16, 32 or another number of clusters 110. The super cluster 130 includes a router 134 and a super cluster controller 132, in addition to the plurality of clusters 110. The router 134 is configured to route packets among the clusters 110 and the super cluster controller 132 within the super cluster 130, and to and from computing resources outside the super cluster 130 via a link to an upstream router. In implementations in which the super cluster 130 is used in a processing device 251, the upstream router for the router 134 is the top level router 104 of the processing device 251 and the router 134 is an upstream router for the router 112 within the cluster 110. In some implementations, the super cluster controller 132 may be configured to implement CCRs, receive and send packets, and implement a fixed-purpose state machine encapsulating packets and memory access to the CCRs. In some cases, the super cluster controller 132 is implemented similar to the way the cluster controller 116 is implemented in a cluster 110. In other implementations, the super cluster 130 is implemented with just the router 134 and does not have a super cluster controller 132. Grouping of processing engines is not limited to clusters or super clusters. In some implementations, more than two levels of grouping is implemented and each level has its own router and controller.

Figure 6:
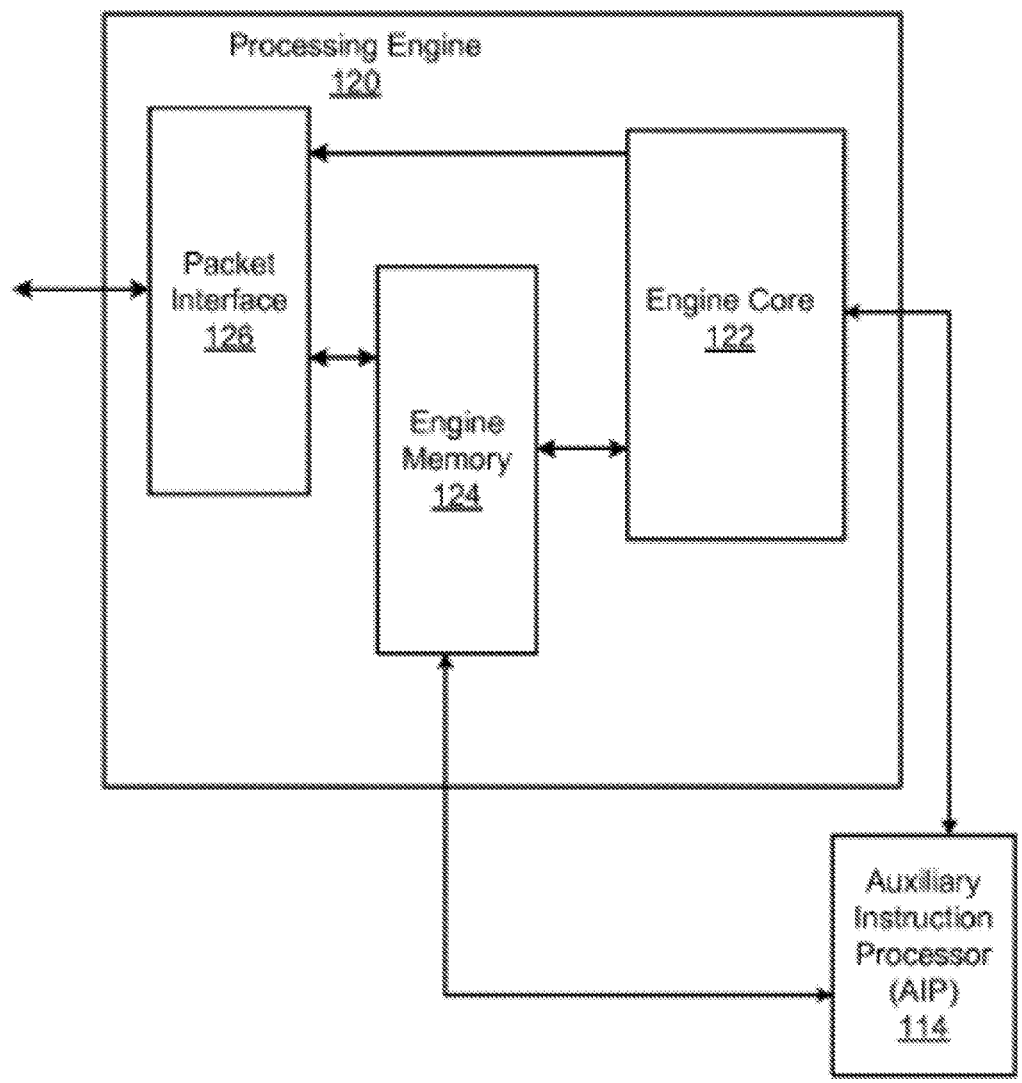
FIG. 6 shows a block diagram of an example of a processing engine of a processing device.

FIG. 6 shows a block diagram of an example of a processing engine 120 of a processing device. A computing resource such as a processing engine 120 can include an engine core 122, an engine memory 124, and a packet interface 126. The processing engine 120 can be directly coupled to an AIP 114. As described above, the AIP 114 may be shared by all processing engines 120 within a cluster 110. In some implementations, the engine core 122 includes a central processing unit (CPU) with an instruction set and implements some or all features of modern CPUs, such as, for example, a multi-stage instruction pipeline, one or more arithmetic logic units (ALUs), one or more floating point units (FPUs) or any other CPU technology. The instruction set includes one instruction set for the ALU to perform arithmetic and logic operations, and another instruction set for the FPU to perform floating point operations. In some cases, the FPU is a completely separate execution unit containing a multi-stage, single-precision floating point pipeline. When an FPU instruction reaches the instruction pipeline of the processing engine 120, the instruction and its source operand(s) are dispatched to the FPU.

The instructions of the instruction set may implement the arithmetic and logic operations and the floating point operations, such as those in the INTEL® x86 instruction set, using a syntax similar or different from the x86 instructions. In some implementations, the instruction set includes customized instructions. For example, one or more instructions are implemented according to the features of the computing system 200 and in accordance with network on a chip architecture. In one example, one or more instructions cause the processing engine executing the instructions to generate packets directly with system wide addressing. In another example, one or more instructions have a memory address located anywhere in the computing system 200 as an operand. In the latter example, a memory controller of the processing engine executing the instruction generates packets according to the memory address being accessed.

The engine memory 124 includes a program memory, a register file including one or more general purpose registers, one or more special registers and one or more events registers. In some implementations, the program memory is a physical memory for storing instructions to be executed by the engine core 122 and data to be operated upon by the instructions. In some cases, portions of the program memory are disabled and powered down for energy savings. For example, a top half or a bottom half of the program memory is disabled to save energy when executing a program small enough that half or less of the storage may be needed. The size of the program memory may be 1 thousand (1K), 2K, 3K, 4K, or any other number of storage units. The register file may include 128, 256, 512, 1024, or any other number of storage units. In some implementations, the storage unit is 32-bit wide, which may be referred to as a longword, and the program memory includes 2K 32-bit longwords and the register file includes 256 32-bit registers.

In some implementations, the register file includes one or more general purpose registers and special registers for the engine core 122. The general purpose registers serve functions that are similar or identical to the general purpose registers of an x86 architecture CPU. The special registers are used for configuration, control and/or status, for instance. Examples of special registers include one or more of the following registers: a next program counter, which may be used to point to the program memory address where the next instruction to be executed by the engine core 122 is stored; and a device identifier (DEVID) register storing the DEVID of the processing device 102.

In some implementations, the register file is implemented in two banks—one bank for odd addresses and one bank for even addresses—to permit multiple fast accesses during operand fetching and storing. The even and odd banks are selected based on the least-significant bit of the register address if the computing system 200 is implemented in little endian or on the most-significant bit of the register address if the computing system 200 is implemented in big-endian.

In some implementations, the engine memory 124 is part of the addressable memory space of the computing system 200. That is, any storage location of the program memory, any general purpose register of the register file, any special register of the plurality of special registers and any event register of the plurality of events registers is assigned a memory address PADDR. Each processing engine 120 on a processing device 102 is assigned an engine identifier (ENGINE ID), therefore, to access the engine memory 124, any addressable location of the engine memory 124 may be addressed by DEVID:CLSID:ENGINE ID: PADDR. In some cases, a packet addressed to an engine level memory location includes an address formed as DEVID:CLSID:ENGINE ID: EVENTS:PADDR, in which EVENTS is one or more bits to set event flags in the destination processing engine 120. It should be noted that when the address is formed as such, the events need not form part of the physical address, which is still DEVID:CLSID:ENGINE ID:PADDR. In this form, the events bits may identify one or more event registers to be set but these events bits are separate from the physical address being accessed.

In accordance with network on a chip architecture, the packet interface 126 includes a communication port for communicating packets of data. The communication port is coupled to the router 112 and the cluster memory 118 of the local cluster. For any received packets, the packet interface 126 directly passes them through to the engine memory 124. In some cases, a processing device 102 implements two mechanisms to send a data packet to a processing engine 120. A first mechanism uses a data packet with a read or write packet opcode. This data packet is delivered to the packet interface 126 and handled by the packet interface 126 according to the packet opcode. Here, the packet interface 126 includes a buffer to hold a plurality of storage units, for example, 1K, 2K, 4K, or 8K or any other number. In a second mechanism, the engine memory 124 further includes a register region to provide a write-only, inbound data interface, which may be referred to a mailbox. In some implementations, the mailbox includes two storage units that each can hold one packet at a time. Here, the processing engine 120 has an event flag, which is set when a packet has arrived at the mailbox to alert the processing engine 120 to retrieve and process the arrived packet. While this packet is being processed, another packet may be received in the other storage unit, but any subsequent packets are buffered at the sender, for example, the router 112 or the cluster memory 118, or any intermediate buffers.

Figure 7A:
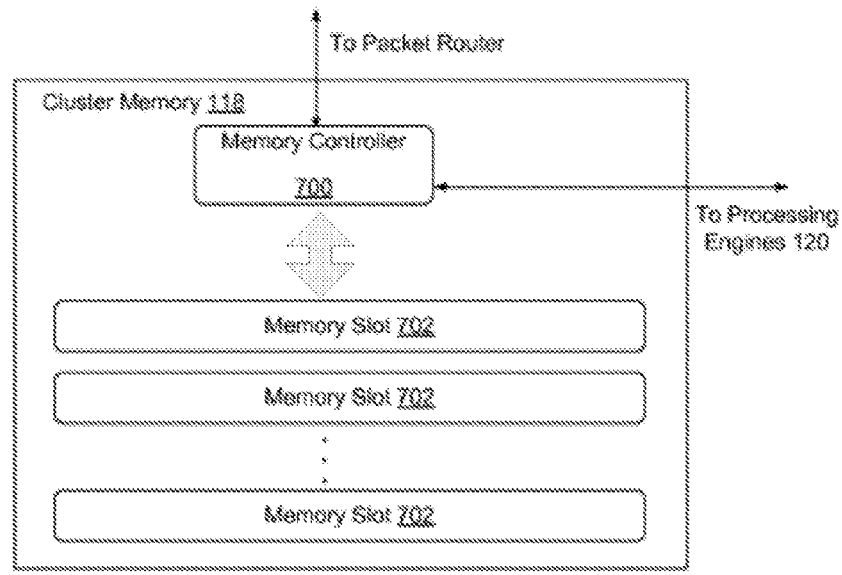
FIG. 7A shows a block diagram of an example of a cluster memory.

FIG. 7A shows a block diagram of an example of a cluster memory 118 of a cluster. The cluster memory 118 includes a memory controller 700 and a plurality of memory slots 702. The memory controller 700 may also be referred to as a cluster memory controller to distinguish it from other memory controllers in a processing device 102; for example, a memory controller for a processing engine 120, or a memory controller for a device controller 106. In some implementations, the memory slots 702 are slots configured to receive memory banks and are configured for memories such as synchronous dynamic random-access memory (SDRAM), double data rate (DDR) SDRAM, DDR2 SDRAM, DDR3 SDRAM, or 3D RAM.

In the example shown in FIG. 7A, the memory controller 700 is coupled to a packet router and to processing engines 120 via different data links. In implementations which have one cluster memory 118 within a cluster 110, the memory controller 700 is coupled to the router 112 of the cluster 110. The memory controller 700 may also be referred to as a smart memory controller because it implements two different access protocols: by packet access and direct memory access.

In some implementations, the data link between the memory controller 700 and a router is a packet-based data communication. In some implementations, the data link between the memory controller 700 and processing engines 120 is a direct data communication. Here, the processing engines 120 coupled to the memory controller 700 are the plurality of processing engines 120 within the same cluster 110 and the direct data communication includes memory access techniques. Examples of existing memory access technologies that may be used for the direct data communication between the memory controller 700 and the plurality of processing engines 120 within the cluster 110 include bus, crossbar, or any other existing memory access techniques for a network on a chip architecture.

Figure 7B:
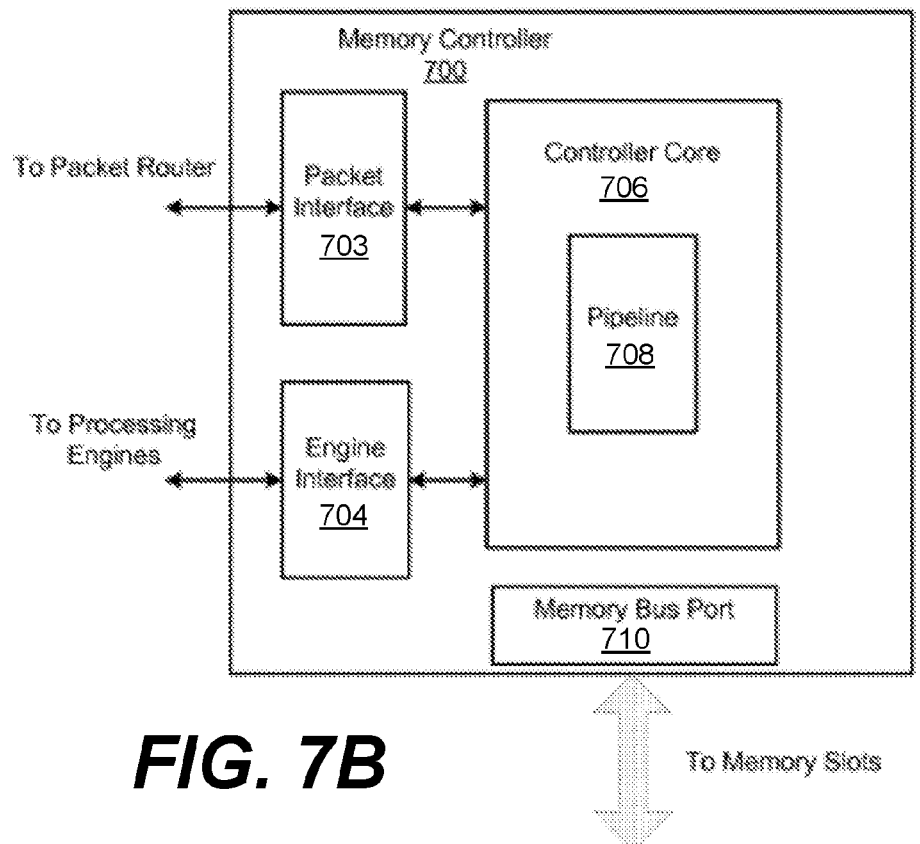
FIG. 7B shows a block diagram of an example memory controller for the cluster memory of FIG. 7A.

FIG. 7B shows a block diagram of an example memory controller 700 for the cluster memory 118 of FIG. 7A. Here, the memory controller 700 includes a packet interface 703, an engine interface 704, a controller core 706 and a memory bus port 710. The engine interface 704 is configured to support direct memory access by the processing engines 120 within the cluster 110. As such, the engine interface 704 implement part or all features of access technologies, such as but not limited to include bus, crossbar, or any other memory access techniques for a network on a chip architecture. The packet interface 703 includes hardware components configured to receive and transmit packets to a router. In some implementations, the packet interface 703 include a queue to buffer received packets and another queue to buffer packets to be sent. Once a packet is received at the packet interface 703, it is forwarded to the controller core 706 for processing. The memory bus port 710 is a data connection port configured to couple the memory controller 700 to the memory slots 702.

The controller core 706 is configured to decode a received packet, perform a memory operation (if required by the packet opcode), and generate a result packet (if necessary). For example, if a received packet has a packet opcode for a memory write, the controller core 706 extracts data from the received packet and writes the data to the memory bank at an address specified in the packet. Likewise, if a received packet has a packet opcode for a memory read, the controller core 706 reads data from the memory address specified in the packet, places the data in a new packet with a destination address specified in the read packet, and sends the new packet to the packet interface 703 to be queued for transmission. In some implementations, the controller core 706 has a structure similar to a typical CPU. For example, the controller core 706 includes an optional pipeline 708 to perform the steps of decoding the packet, performing the memory operation, and generating a result packet.

A computing system can use packets for data requests and delivery among different computing resources of the system. A packet can include a header and an optional payload. The header can include a destination address field, a packet opcode (POP) field, and a size field. In some implementations, a source address field is not required to be included within a packet. A destination address field can indicate the address of the destination computing resource of the packet. In some implementations, the destination address can be an address at a device controller level such as DEVID:PADDR, an address at a cluster level such as a physical address DEVID:CLSID:PADDR or a virtual address DEVID:CLSID: ADDR, or an address at a processing engine level such as DEVID:CLSID:ENGINE ID:PADDR or DEVID:CLSID:ENGINE ID:EVENTS:PADDR. In some implementations, a packet header can include an addressing mode field and an addressing level field. The addressing mode field can include a value to indicate whether the packet's destination address field contains a physical address or a virtual address that may need to be converted to a physical address at a destination. The addressing level field can include a value to indicate whether the destination is at a device, cluster memory, or processing engine level.

The POP field may include a code to indicate an operation to be performed by the destination computing resource. Exemplary operations in the POP field may include read (to read data from the destination) and write (to write data, e.g., in a packet payload to the destination). In some implementations, examples of operations in the POP field further include bulk data transfer. For example, certain computing resources implement a direct memory access (DMA) feature. Examples of computing resources that implement DMA may include a cluster memory controller of each cluster memory 118, a memory controller of each engine memory 124, and a memory controller of each device controller 106. A computing resource that implements the DMA may perform bulk data transfer to another computing resource using packets with a packet opcode for bulk data transfer. In addition to bulk data transfer, the examples of operations in the POP field further include transmission of unsolicited data. For example, any computing resource may generate a status report or incur an error during operation, the status or error is reported to a destination using a packet with a packet opcode indicating that the payload contains the source computing resource and the status or error data. The POP field may be 2, 3, 4, 5 or any other number of bits wide. In some implementations, the width of the POP field is selected depending on the number of operations defined for packets in a computing system. In some implementations, a packet opcode value can have different meaning based on the type of the destination computing resource that receives it. For example, for a three-bit POP field, a value 001 may be defined as a read operation for a processing engine 120 but a write operation for a cluster memory 118.

A packet can include a payload. In some implementations, if a particular packet does not include a payload, the packet length field of the header has a value of zero. In some implementations, the payload of the packet includes a return address. For example, if a packet is a read request, the return address for any data to be read can be contained in the payload.

Figure 8A:
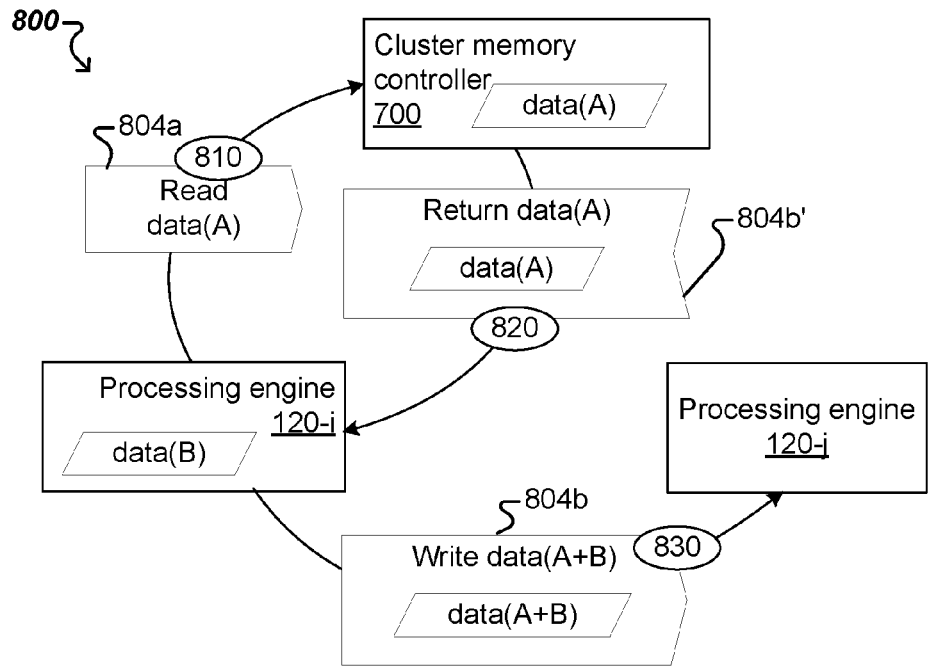
FIGS. 8A and 8B show different examples of processes for reading and writing data within a network on a chip based computing system using packet based communications.
Figure 8B:
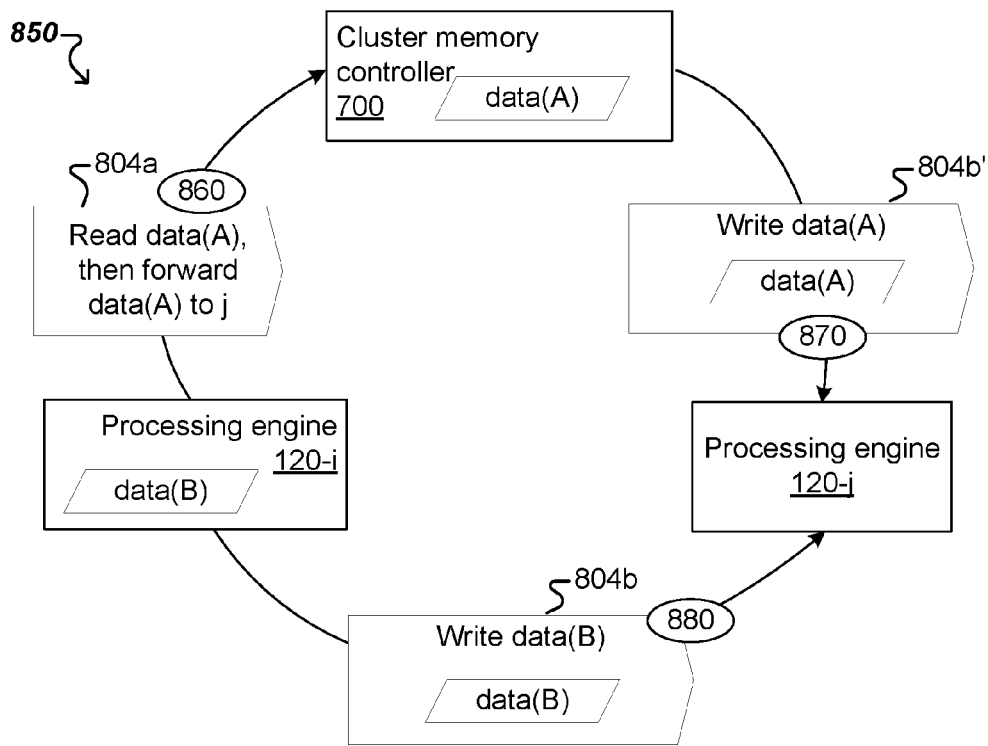
Figure 8C:
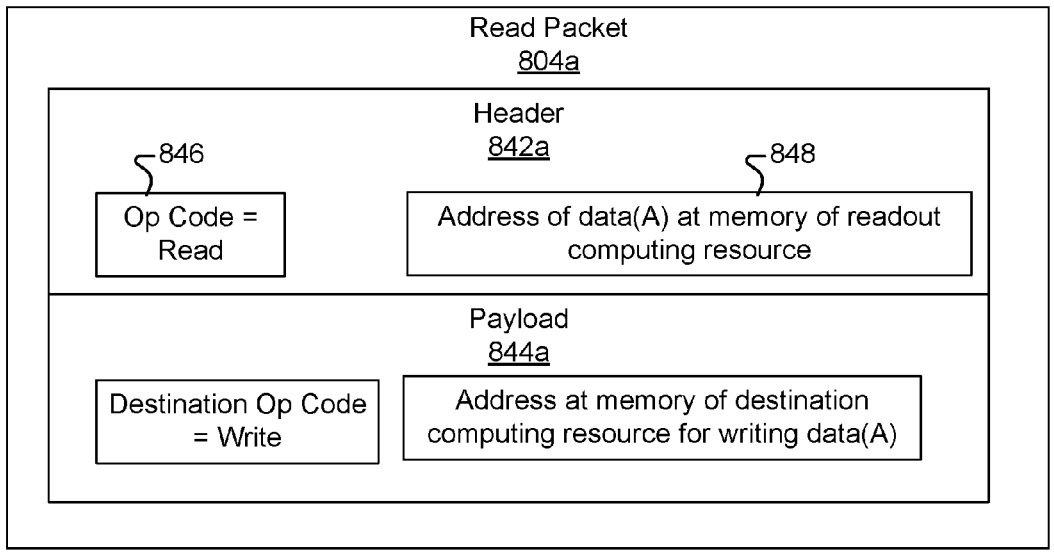
FIGS. 8C and 8D show different examples of packet formats associated with the processes of FIGS. 8A and 8B.
Figure 8D:
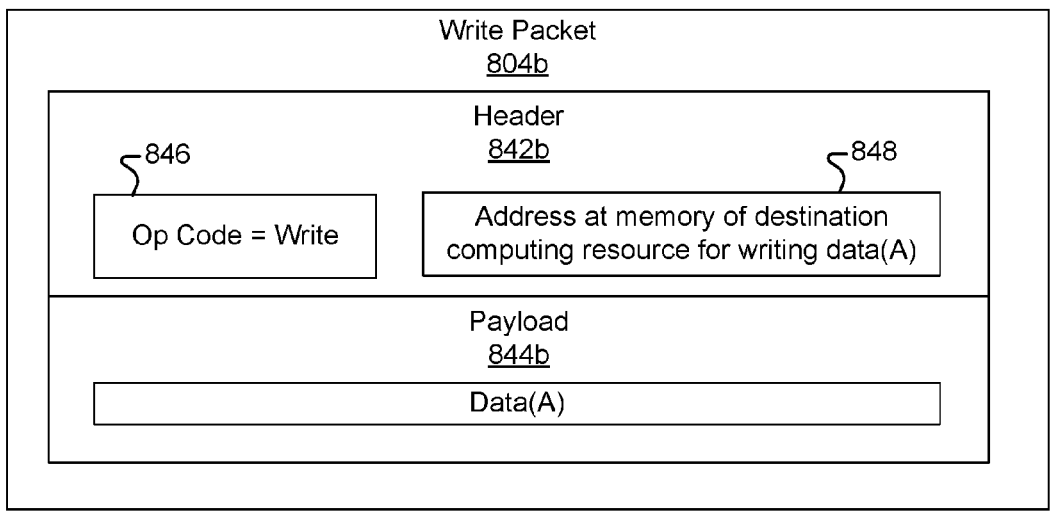

FIGS. 8A and 8B show different examples of processes 800 and 850 for reading and writing data within a network on a chip based computing system using packet based communications. FIGS. 8C and 8D show different examples of packet formats associated with the processes of FIGS. 8A and 8B. In more detail, FIGS. 8A and 8B show aspects of respective examples of processes 800 and 850 of writing first data, stored in a memory associated with an originator computing resource, and second data, stored in a memory associated with an intermediary computing resource, to a memory associated with a destination computing resource, where read packets 804a and write packets 804b are used to perform the processes 800 and 850. The originator computing resource, the intermediary computing resource and the destination computing resource are part of a network on a chip based computing system. The computing resources that can implement processes 800 and 850 can include device controller 106, cluster controller 116, AIP 114, super cluster controller 132, processing engine 120, memory controller 700 of cluster memory 118. Other resources are possible.

In the examples illustrated in FIGS. 8A and 8B, the originator computing resource includes a processing engine 120-i, the intermediary computing resource includes a cluster memory controller 700 and the destination computing resource includes another processing engine 120-j. Here, a cluster memory (e.g., 118) controlled by the cluster memory controller 700 may be part of the same cluster (e.g., 110) to which one or both of the processing engines 120-i and 120-j belong, or may be part of a different cluster of the same processing device (e.g., 102) or of a different processing device. Moreover, the processing engines 120-i and 120-j may be part of the same cluster, or may be part of different clusters of the same processing device or of a different processing device.

Referring now to FIG. 8A, the process 800 of writing data B (denoted data(B)), stored in a memory associated with the processing engine 120-i, and data A (denoted data(A)), stored in cluster memory (e.g., 118) controlled by the cluster memory controller 700, to a memory associated with the other processing engine 120-j is described first. The processing engine 120-i accesses data(B) in the memory associated with the processing engine 120-i. Additionally, at 810, the processing engine 120-i transmits a read packet 804a to instruct the cluster memory controller 700 to read data(A) from the cluster memory. In response to receiving this instruction, the cluster memory controller 700 accesses data(A) in the cluster memory and, at 820, transmits data(A) in a response packet 804b' to the processing engine 120-i. At 830, the processing engine 120-i transmits a write packet 804b, that includes data(A) and data(B) (denoted as appended data(A+B)), to the other processing engine 120-j. The write packet 804b also includes data specifying an instruction for the other processing engine 120-j to write appended data(A+B) to the memory associated with the other processing engine 120-j. Upon receipt of the write packet 804b, the other processing engine 120-j writes appended data(A+B) to the memory associated with the other processing engine 120-j, as instructed.

Referring now to FIG. 8B, the process 850 of writing data(B), stored in a memory associated with the processing engine 120-i, and data(A), stored in cluster memory (e.g., 118) controlled by the cluster memory controller 700, to a memory associated with the other processing engine 120-j is described next. The processing engine 120-i accesses data (B) in the memory associated with the processing engine 120-i. Additionally, at 860, the processing engine 120-i transmits a read packet 804a to instruct the cluster memory controller 700 to read data(A) from the cluster memory and to forward data(A) to the other processing engine 120-j for writing to the memory associated with the other processing engine 120-j. In response to receiving this instruction, the cluster memory controller 700 accesses data(A) in the cluster memory and, at 870, transmits data(A) in a write packet 804b' to the other processing engine 120-j. The write packet 804b also includes data specifying an instruction for the other processing engine 120-j to write data(A) to the memory associated with the other processing engine 120-j. Upon receipt of the write packet 804b, the other processing engine 120-j writes the data(A) to the memory associated with the other processing engine 120-j, as instructed. In the meantime, at 880, the processing engine 120-i (asynchronously) transmits another write packet 804b that includes data(B) to the other processing engine 120-j. The other write packet 804b also includes data specifying an instruction for the other processing engine 120-j to write data(B) to the memory associated with the other processing engine 120-j. Upon receipt of the other write packet 804b, the other processing engine 120-j writes the data(B) to the memory associated with the other processing engine 120-j, as instructed.

FIG. 8C shows an example of a read packet 804a that can be used in either of the processes 800 or 850 to instruct a readout computing resource (e.g., cluster memory controller 700) of a computing system to read data(A). In this example, the read packet 804a has a header 842a and a payload 844a. The header 842a can include an opcode 846 and a destination address. In this example, the destination address includes address 848 of data(A) at memory associated with the readout computing resource to which the read packet 804a is addressed. Here, the opcode 846 has a value corresponding to a "read" operation and specifies an instruction for the readout computing resource to read data(A) from the memory address 848. The payload 844a can include information relating to a destination computing device where data(A) is to be forwarded to after it has been read by the readout computing device from the memory address 848. Here, the payload 844a includes at least an opcode that specifies an instruction for the destination computing resource to write data(A), and a memory address at which the destination computing resources should write data(A).

FIG. 8D shows an example of a write packet 804b that can be used in either of the processes 800 or 850 to instruct a destination computing resource (e.g., a processing engine 120-j) of a computing system to write data(A) provided in the write packet. In this example, the write packet 804b includes a header 842b and a payload 844b. The payload 844b includes data(A). The header 842b includes at least an opcode 846 and an address 848 at memory associated with the destination computing resource. Here, the opcode 846 has a value corresponding to a "write" operation and specifies an instruction for the destination computing resource to write data(A) at the address 848.

Referring again to FIG. 8A, note that, by performing the process 800, it is insured that data(A), initially stored at an intermediary computing resource, in this case at the cluster memory, reaches a destination computing resource, in this case the other processing engine 120-j, no later than data(B), initially stored at an originator computing resource, in this case the processing engine 120-i, so that, e.g., the destination computing resource can process data(A) before processing data(B). Moreover, by performing the process 850 described in connection with FIG. 8B, it is not guaranteed that data(A), initially stored at the intermediary computing resource, in this case at the cluster memory, reaches the destination computing resource, in this case the other processing engine 120-j, no later than data(B), initially stored at the originator computing resource, in this case the processing device 120-i, so that, e.g., the destination computing resource can process data(A) before processing data(B).

Packets can be grouped together to form a chained packet sequence. A packet header can include a chain indicator to indicate a presence of a chained packet sequence. Various examples of a chain indicator include a chain bit, a chain length, or a chain packet count. Other types of chain indicators are possible. In some implementations, a chain indicator can include a bit field to indicate whether a subsequent packet is part of a chained packet sequence. In some implementations, a chain indicator can include a chain length field to indicate a length of the chained packet sequence. The indicated length can correspond to a quantity of packets in the chained packet sequence.

Figure 9A:
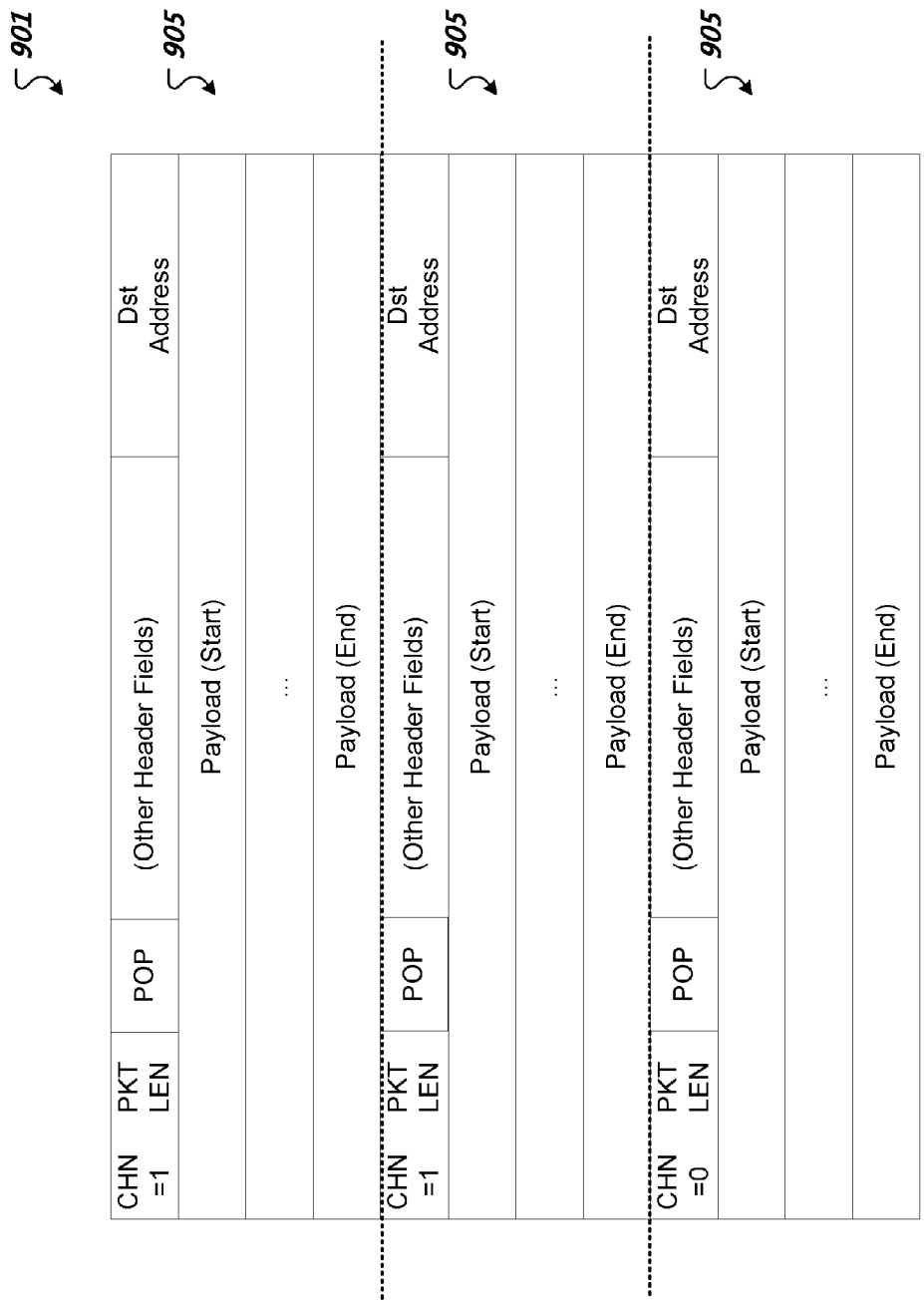
FIGS. 9A and 9B show a format of different example of a chained packet sequence.

FIG. 9A shows a format of an example of a chained packet sequence 901. In this example, the chained packet sequence 901 is formed from three packets 905. Note that any number (e.g., 1, 2, 3, 10, 45, or more) of packets can form a chained packet sequence. The packets 905 of the chained packet sequence 901 are adjacent to each other. A header of a packet 905 can include a chain (CHN) bit, packet length, packet opcode (POP), and destination address fields. A packet 905 can include a payload. The chain bit of a packet 905 can indicate weather to treat the next packet 905 as part of the chained packet sequence 901. The chain bit of the final packet 905 of the chained packet 905 can indicate that it is the final packet. In this example, a chain bit of 1 causes a router to treat the next packet 905 as part of the chained packet sequence 901, whereas a chain bit of 0 causes a router to treat the next packet (if it exists) as a separate packet, which can be a standalone packet or a packet belonging to a different chained packet.

Figure 9B:
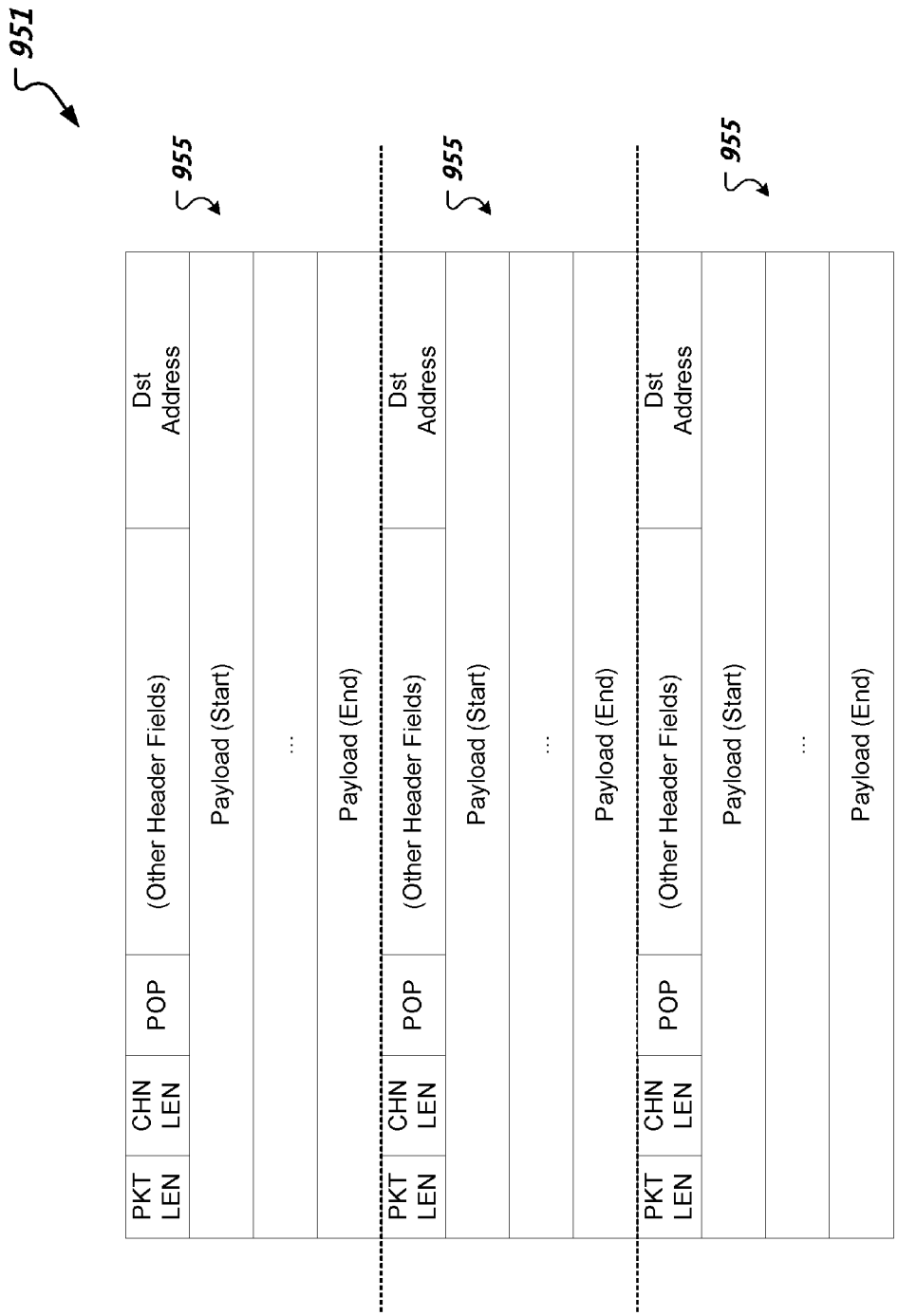

FIG. 9B shows a format of another example of a chained packet sequence 951. In this example, the chained packet sequence 951 is formed from three packets 955. The packets 955 of the chained packet sequence 951 are adjacent to each other. A header of a packet 955 can include a packet length, a chain (CHN) length, packet opcode (POP), and destination address fields. A packet 955 can include a payload. The chain length field of a packet 955 can indicate the overall length of the chained packet sequence 951, whereas the packet length field of the packet 955 indicates the length of only the packet 955. Thus, the chain length represents the sum of all packet lengths belonging to the chained packet sequence 951. The units of length can different for the packet length and the chain length, for example, one can be expressed in N-Byte units, whereas the other can be expressed in M-Byte units; where N is greater than M. In some implementations, the chain length of the last packet 955 of the chained packet sequence 951 is set to zero. In some implementations, the chain length field is replaced by a chain packet count field. For examples, each packet of a chained packet can include a chain packet count that represents the total number of packets that belongs to the chained packet. In some implementations, the chain packet field of the ending packet of a sequence 951 can be set to zero to denote the end of the chain.

In some implementations, a beginning packet of a chained packet sequence includes a chain indicator and the remaining packets of the sequence do not include a chain indicator. In some implementations, the packets can include a variable length header. Generating a chained packet sequence can include inserting a chain indicator into a header and inserting a signaling field to indicate the presence of the chain indicator. The chain indicator can include a chain length field to indicate a length of the chained packet sequence. After processing one or more packets of the sequence, forwarding a remaining portion of the sequence can include identifying the new beginning packet of the sequence and inserting, into the header of this packet, a chain indicator and a signaling field to indicate the presence of the chain indicator.

FIG. 10 shows a format of an example of a chained packet sequence 1001 including barrier indicators in respective packet headers. Barrier indicators can provide synchronization within the sequence 1001. In this example, packets 1005 within the chained packet sequence 1001 include barrier indicators in respective packet headers. In some implementations, the barrier indicator can be encoded within an opcode, e.g., the POP field indicates a barrier operation. In some implementations, the barrier indicator is included within a payload of a packet 1005. In some implementations, a barrier indicator of a packet 1005 can indicate whether the instruction specified by the opcode of the packet 1005 must be completed before processing occurs for any remaining packets 1005 of the chained packet sequence 1001. In some implementations, a barrier indicator of a packet 1005 can indicate whether one or more previous instructions indicated by one or more previous packets 1005 of the sequence must be completed before proceeding to the instruction indicated by the packet 1005 of the sequence.

Figure 11:
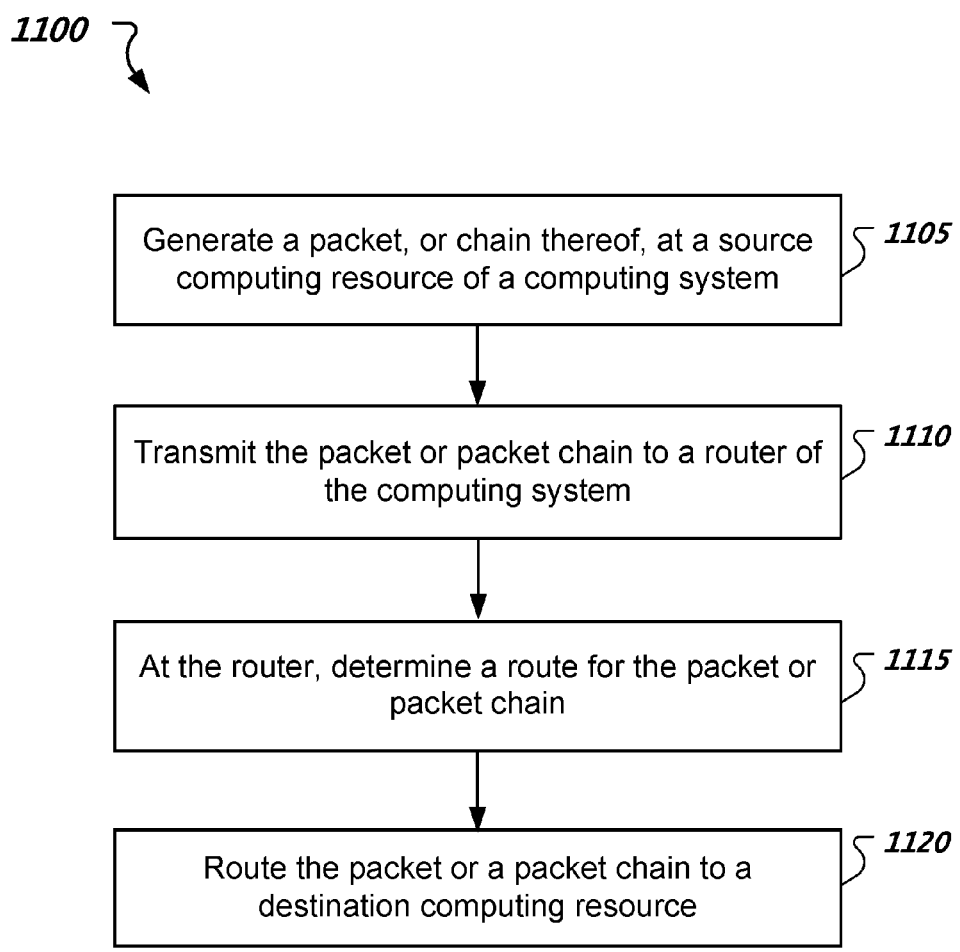
FIG. 11 shows a flow diagram showing an example of a process of addressing a computing resource of a computing system using a packet or packet chain in accordance with a network on a chip based computing system.

FIG. 11 shows a flow diagram showing an example of a process 1100 of addressing a computing resource of a computing system using a packet or packet chain in accordance with a network on a chip based computing system. A computing system can include one or more processing devices configured to execute some or all of the operations of the process 1100 in response to instructions stored electronically on an electronic storage medium. The one or more processing devices can include one or more devices configured through hardware, firmware, and/or software to execute one or more of the operations of the process 1100. At 1105, the process 1100 can generate a packet or packet chain at a source computing resource of the computing system. The source computing resource can be, for example, a device controller, a cluster controller, a super cluster controller if a super cluster is implemented, an AIP, a memory controller for a cluster memory, or a processing engine.

At 1105, the process 1100 can transmit the packet or packet chain to an appropriate router based on the source computing resource that generated the packet. For example, if the source computing resource is a device controller, the generated packet is transmitted to a top level router of the local processing device; if the source computing resource is a cluster controller, the generated packet is transmitted to a router of the local cluster; if the source computing resource is a memory controller of the cluster memory, the generated packet is transmitted to a router of the local cluster, or a router downstream of the router if there are multiple cluster memories coupled together by the router downstream of the router; and if the source computing resource is a processing engine, the generated packet is transmitted to a router of the local cluster if the destination is outside the local cluster and to a memory controller of the cluster memory of the local cluster if the destination is within the local cluster.

At 1115, the process 1100 includes determining a route for the generated packet or packet chain at the router. The generated packet includes a header that includes a destination address. In some implementations, the destination address is an addressable location of a uniform memory space of a computing system. The uniform memory space is an addressable space that covers all memories and registers for each device controller, cluster controller, super cluster controller if a super cluster is implemented, cluster memory and processing engine of the computing system. In some cases, the addressable location is part of a destination computing resource of the computing system. The destination computing resource may be, for example, another device controller 106, another cluster controller, a memory controller for another cluster memory, or another processing engine, which is different from the source computing resource. The router that received the generated packet determines the route for the generated packet based on the destination address. For a packet chain, the router can use the destination address of a beginning packet of the packet chain to determine the next path of the packet chain's route. At 1120, the generated packet or packet chain is routed to a destination computing resource.

Figure 12:
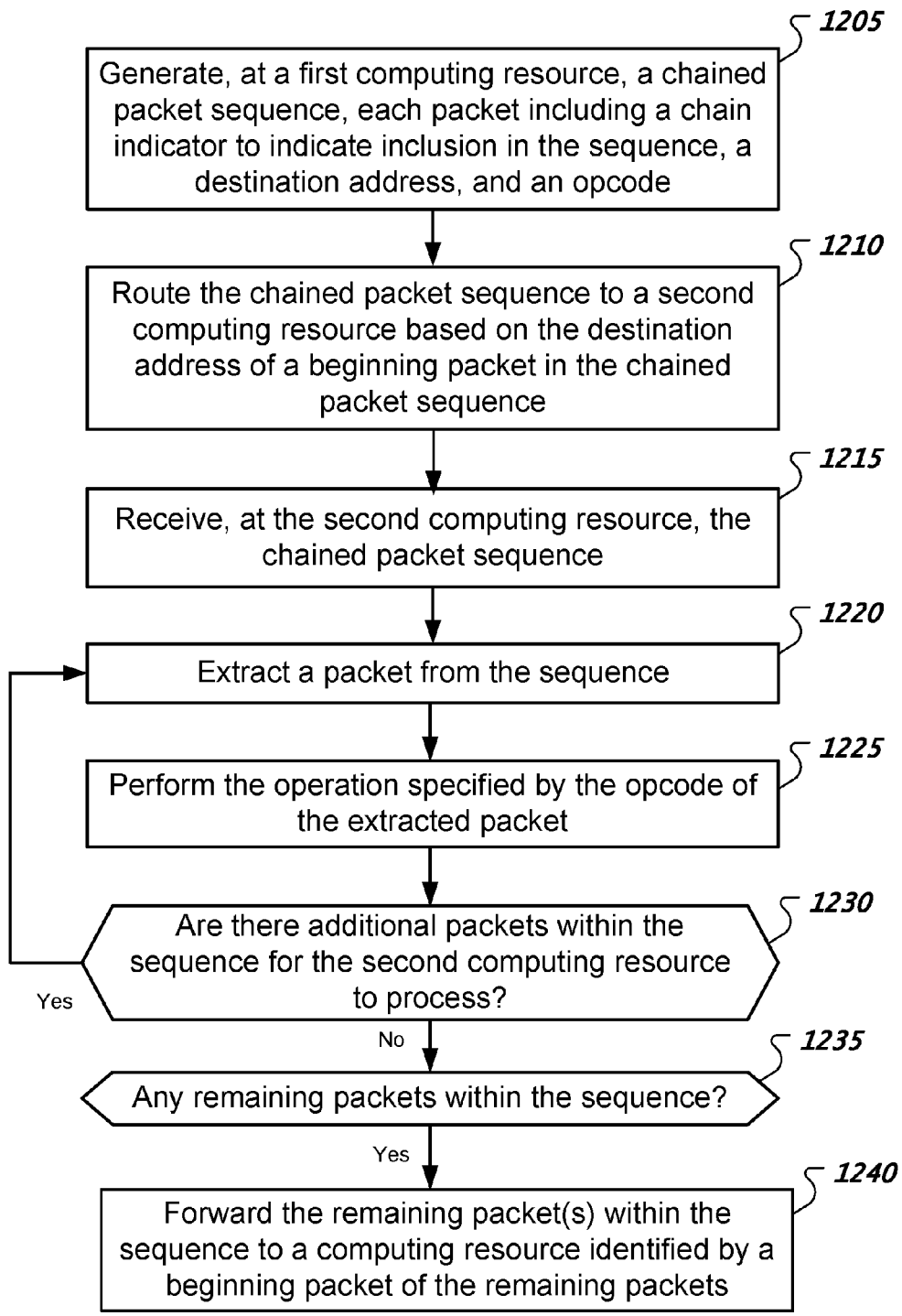
FIG. 12 shows a flow diagram of an example of a process of handling of a chained packet sequence within a computer system.

FIG. 12 shows a flow diagram of an example of a process of handling of a chained packet sequence within a computer system. At 1205, the process generates, at a first computing resource of the computer system, a chained packet sequence of two or more packets. Each packet within the sequence can include a chain indicator to indicate inclusion (of itself and/or the next packet) in the chained packet sequence, a destination address, and an opcode that specifies an operation to be performed by a computing resource associated with the destination address. In some implementations, the chain indicator of an immediately previous packet can be used to indicate whether the current packet is a member of the sequence. Thus, if a packet's chain indicator is not set, then it can mean that the packet is the ending packet of the sequence member or a single packet sequence.

At 1210, the process routes the chained packet sequence to a second computing resource of the computing system based on the destination address of a beginning packet in the chained packet sequence. A router of the computing system can ignore (e.g., need not route based on) the destination addresses of the packets that are not the beginning packet of the sequence.

At 1215, the process receives, at the second computing resource, the chained packet sequence. In some implementations, the second computing resource can include an input queue to receive packets. At 1220, the process extracts a packet from the sequence. Extracting a packet can include accessing one or more packet fields such as an opcode. At 1225, the process performs, at the second computing resource, the operation specified by the opcode of the extracted packet.

At 1230, the process determines whether there are additional packets within the sequence for the second computing resource to process. If there is an additional packet, then the packet is extracted at 1220 and processed at 1225. If there are no additional packets for the second computing resource, then the process, at 1235, determines whether there are any remaining packets within the sequence. If so, the process, at 1240, forwards the remaining one or more packets within the sequence to a computing resource identified by a beginning packet of the one or more remaining packets.

Figure 13:
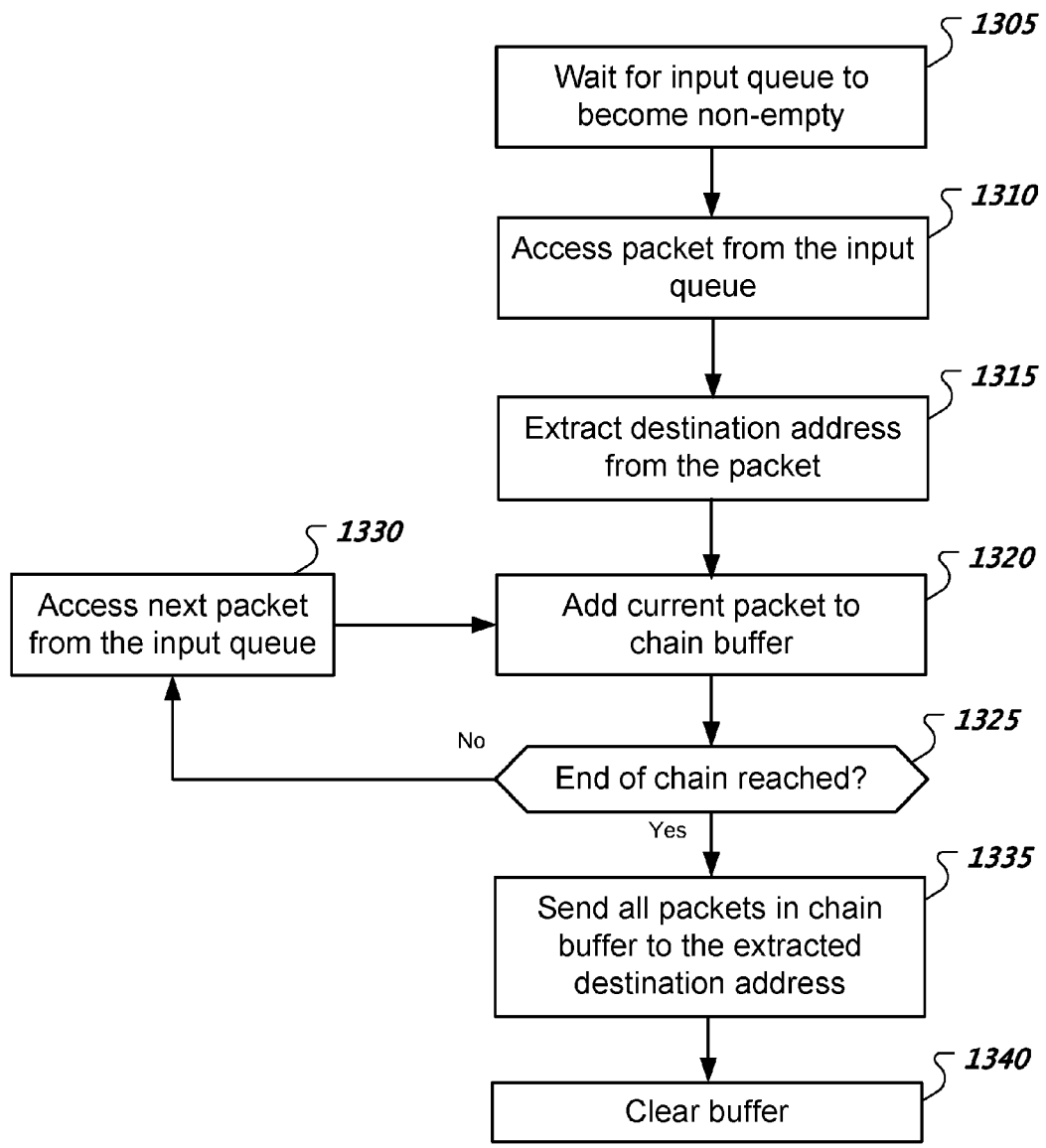
FIG. 13 shows an example of a router process for handling a chained packet sequence.

FIG. 13 shows an example of a router process for handling a chained packet sequence. A router can include an input queue to handle incoming packets and chained sequences of packets. At 1305, the process waits (if needed) for the input queue to become non-empty. At 1310, the process accesses a packet from the input queue. In some implementations, the process accesses a pointer to a packet. At 1315, the process extracts the destination address from the packet. Extracting the destination address can include accessing a data array corresponding to the packet at a predetermined offset that is based on a starting location of the destination address relative to the start of the packet. At 1320, the process adds the current packet to a chain buffer. In some implementations, adding the packet to a chain buffer can include removing the packet from the input queue and writing the packet to the chain buffer. In some implementations, the chain buffer is formed within the input queue. In some implementations, a chain buffer can store pointers to packets within the input queue.

At 1325, the process determines whether the end of the chain is reached. The process can include extracting a chain indicator from the header of the current packet. For a chain bit, the process can determine whether the chain bit of the current packet indicates that the next packet is apart of the chained packet sequence. For a chain indicator such as a chain length, the process can determine whether the chain length value is greater than zero, determine a cumulative length of packets already in the chain buffer, and determine whether there are any remaining packets to be included into the chained packet sequence based on a difference between the chain length value and the cumulative length. If the end of the chain has not been reached, then at 1330, the process accesses a next packet from the input queue and continues at 1320 to add the next packet to the chain buffer.

If the end of the chain has been reached, then at 1335, the process sends all packets in the chain buffer to the extracted destination address. In some implementations, sending all packets in the chain buffer can include sending packets in the input queue that are pointed to by pointers stored in the chain buffer. Note that if the initial packet added to the chain buffer does not have its chain indicator set, then the chain buffer has a single packet, and the process at 1335, would send the single packet. At 1340, the process clears the chain buffer. In some implementations, clearing the chain buffer can include removing packets from the input queue that correspond to the chained packet sequence.

Figure 14:
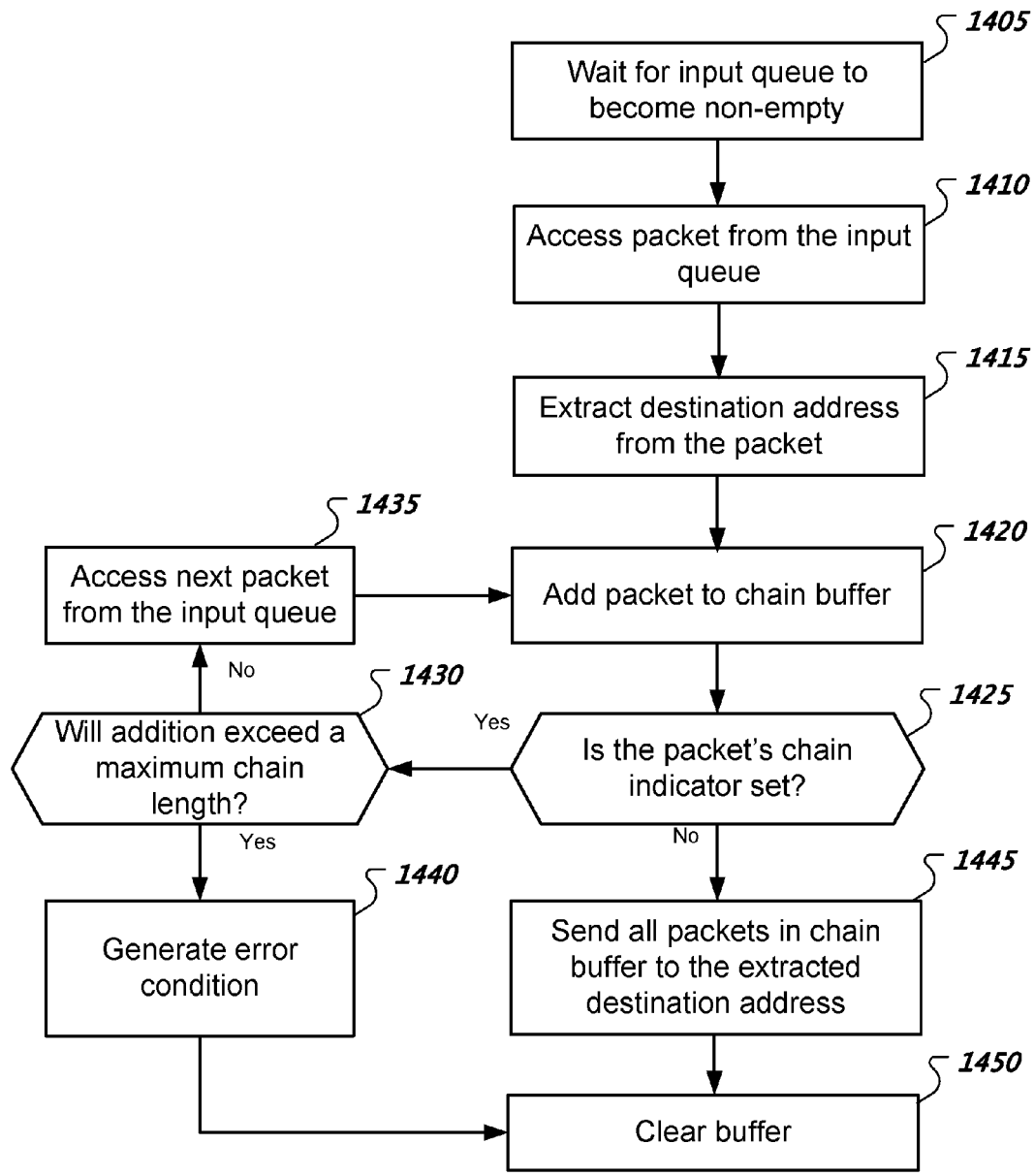
FIG. 14 shows an example of a router process for handling a chained packet sequence that includes checking a maximum chain length.

FIG. 14 shows an example of a router process for handling a chained packet sequence that includes checking a maximum chain length. At 1405, the process waits for an input queue to become non-empty. However, this process can apply regardless of whether the input queue is empty or not. At 1410, the process accesses a packet from the input queue. At 1415, the process an extracts destination address from the packet. At 1420, the process adds the packet to chain buffer. At 1425, the process determines whether the packet's chain indicator is set. If the chain indicator is set, then at 1430, the process determines whether the addition of another packet to the chain would exceed a maximum chain length. The determination at 1430 can include checking a capacity level of the chain buffer and comparing the level to a maximum chain length. If the addition would not exceed a maximum chain length, then at 1435, the process accesses the next packet from the input queue and continues at 1420 to add the next packet to the chain buffer. The process continues to add packets to the chain buffer based on the packet chain indicators.

If the chain indicator is not set, then at 1435, the process sends all packets in the chain buffer to the extracted destination address. Note that if the initial packet added to the chain buffer does not have its chain indicator set, then the chain buffer has a single packet, and the process at 1435, would send the single packet. At 1440, the process clears the chain buffer.

If the addition to the chain buffer would exceed a maximum chain length, then at 1440, the process generates an error condition. Various examples of generating error conditions include raising an exception, setting an error event, or sending an error signal. Other types of error conditions are possible. At 1450, the process clears the chain buffer. In some implementations, if the chained packet sequence exceeds a maximum chain length, a router can fragment the sequence and transmit the fragments separately.

Figure 15:
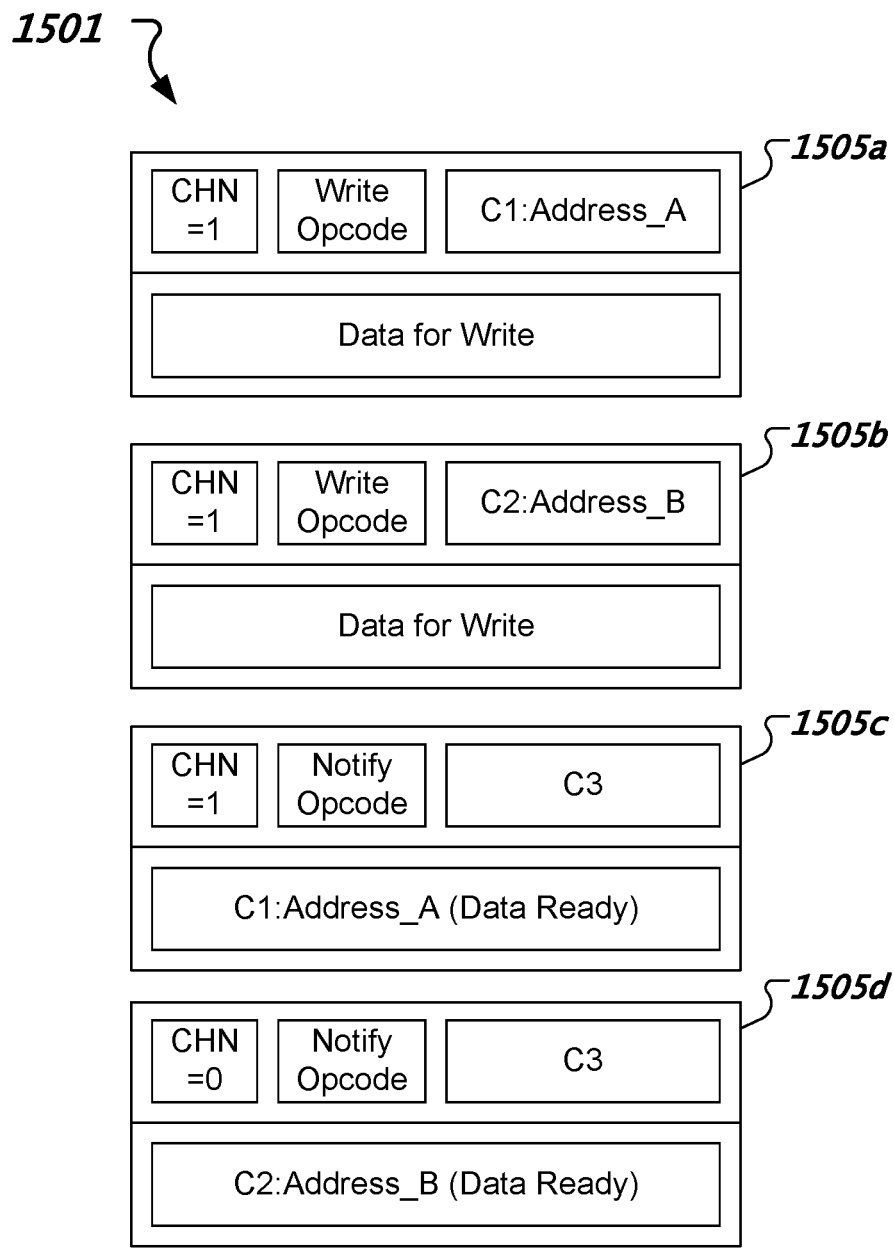
FIG. 15 shows a high-level example of a chained packet sequence that causes a plurality of write operations and notify operations at different computing resources.

FIG. 15 shows a high-level example of a chained packet sequence 1501 that causes a plurality of write operations and notify operations at different computing resources. The chained packet sequence 1501 includes packets 1505*a*, 1505*b*, 1505*c*, and 1505*d*. The beginning packet 1505*a* of the chained packet sequence 1501 of FIG. 15A includes a packet header. The header can contain a chain bit (set to TRUE in this example), an opcode that specifies a write operation, and a destination address. Note that other header fields can exist (not shown in FIG. 15A). The destination address can be composed of a device identifier (e.g., the identifier for the C1 computing resource) and a memory address (e.g., Address A) of a memory associated with the specific device identifier. The beginning packet 1505*a* includes a payload. In this example, the payload includes the data for the write operation. Once received by the C1 computing resource, C1 will write data from the payload to Address A of C1's memory. Since the next packet 1505*b* of the chained packet sequence 1501 of FIG. 15 specifies a different destination address, the C1 computing resource forwards the remaining packets 1505*b-d* to the computing resource specified by the next packet 1505*b*. Once received by the C2 computing resource, C2 will write data from the payload of the packet 1505*b* to Address B of C2's memory which was specified in the header of the packet 1505*b*. In this example, the chained packet sequence 1501 includes two notification packets 1505*c*, 1505*d*. A first notification packet 1505*c* informs the C3 computing resource about the completion of the write operation corresponding to packet 1505*a*. A second notification packet 1505*c* informs the C3 computing resource about the completion of the write operation corresponding to packet 1505*b*.

Figure 16:
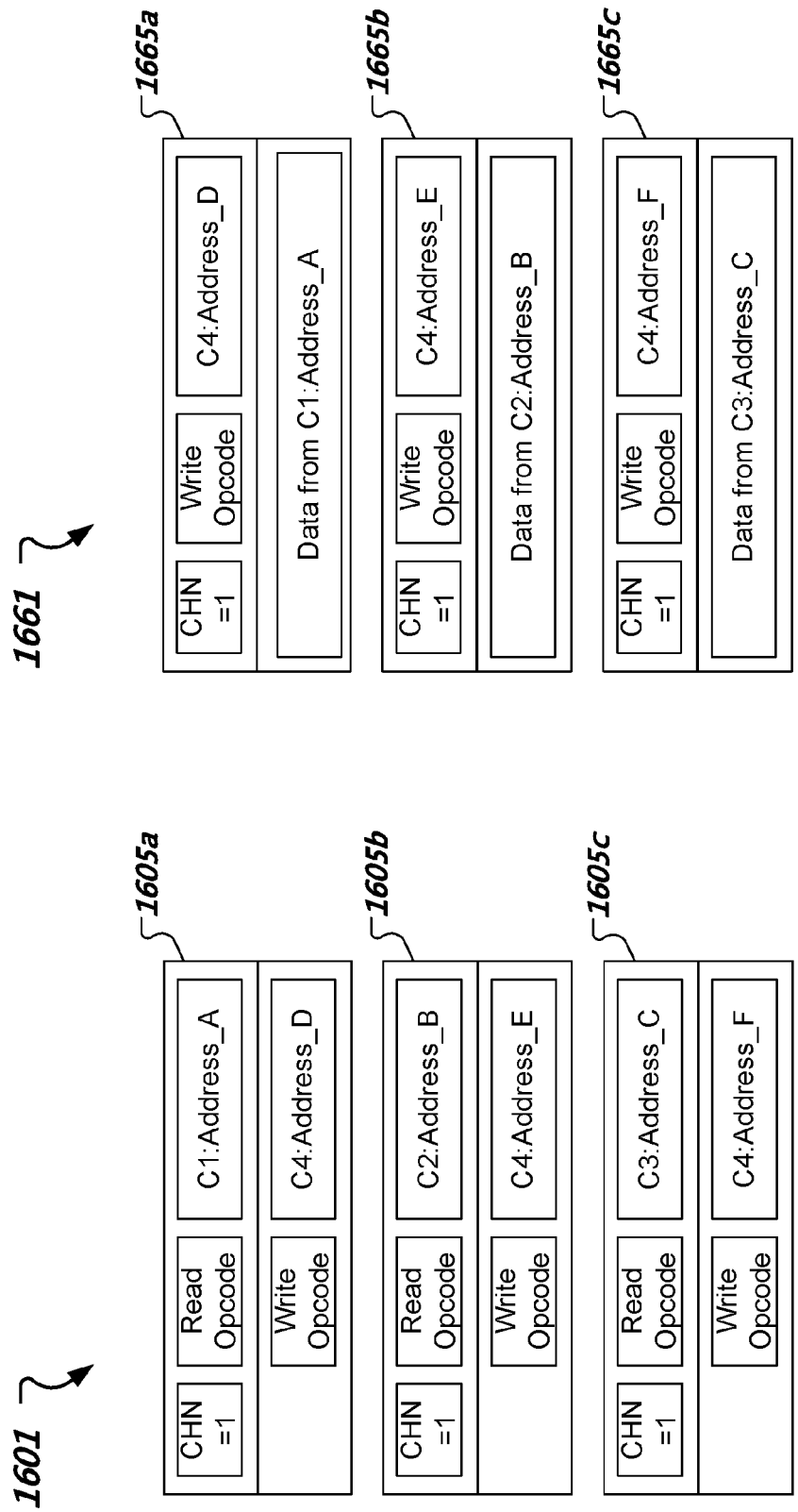
FIG. 16A shows a high-level example of a chained packet sequence that causes a plurality of read operations at different computing resources.
FIG. 16B shows a high-level example of a response chained packet sequence that is generated in response to the chained packet sequence of FIG. 16A.

FIG. 16A shows a high-level example of a chained packet sequence 1601 that causes a plurality of read operations at different computing resources. The chained packet sequence 1601 includes packets 1605*a*, 1605*b*, and 1605*c*. FIG. 16B shows a high-level example of a response chained packet sequence that is generated in response to the chained packet sequence of FIG. 16A. The response chained packet sequence 1661 includes response packets 1665a, 1665b, and 1665c. The read data requested by packets 1605a, 1605b, and 1605c are returned in response packets 1665a, 1665b, and 1665c, respectively.

The beginning packet 1605a of the chained packet sequence 1601 of FIG. 16A includes a packet header. The header can contain a chain bit (set to TRUE in this example), an opcode that specifies a read operation, and a destination address. Note that other header fields can exist (not shown in FIG. 16A). The destination address can be composed of a device identifier (e.g., the identifier for the C1 computing resource) and a memory address (e.g., Address A) to a data element that is stored at a memory associated with the specific device identifier. The beginning packet 1605a includes a payload that specifies destination for the output of the read operation. In this example, the payload includes an opcode that specifies a write, and includes a response destination address. Once received by the C1 computing resource, C1 will read data from Address A of C1's memory and generate a packet based on the payload of the packet 1605a. In this example, the payload causes C1 to generate a response packet 1665a for sending the data from Address A to another computing resource (C4) at Address D of that resource's memory. Since the next packet 1605b of the chained packet sequence 1601 of FIG. 16A specifies a different destination address, the C1 computing resource forwards the remaining packets 1605b-c to the computing resource specified by the next packet 1605b.

In the next packet 1605b of the chained packet sequence 1601 of FIG. 16A, the packet header is addressed to the C2 computing resource and contains a read opcode. The C2 computing resource will perform a read and forward the contents of the read output to the destination address specified in the payload of the packet 1605b in the response packet 1665b. Similar operations result from the ending packet 1605c of the chained packet sequence 1601 of FIG. 16A and result in the generation of response packet 1665c. In some implementations, a router or a computing resource can aggregate the response packets 1665a-c into the response chained packet sequence 1661 of FIG. 16B.

Figure 17:
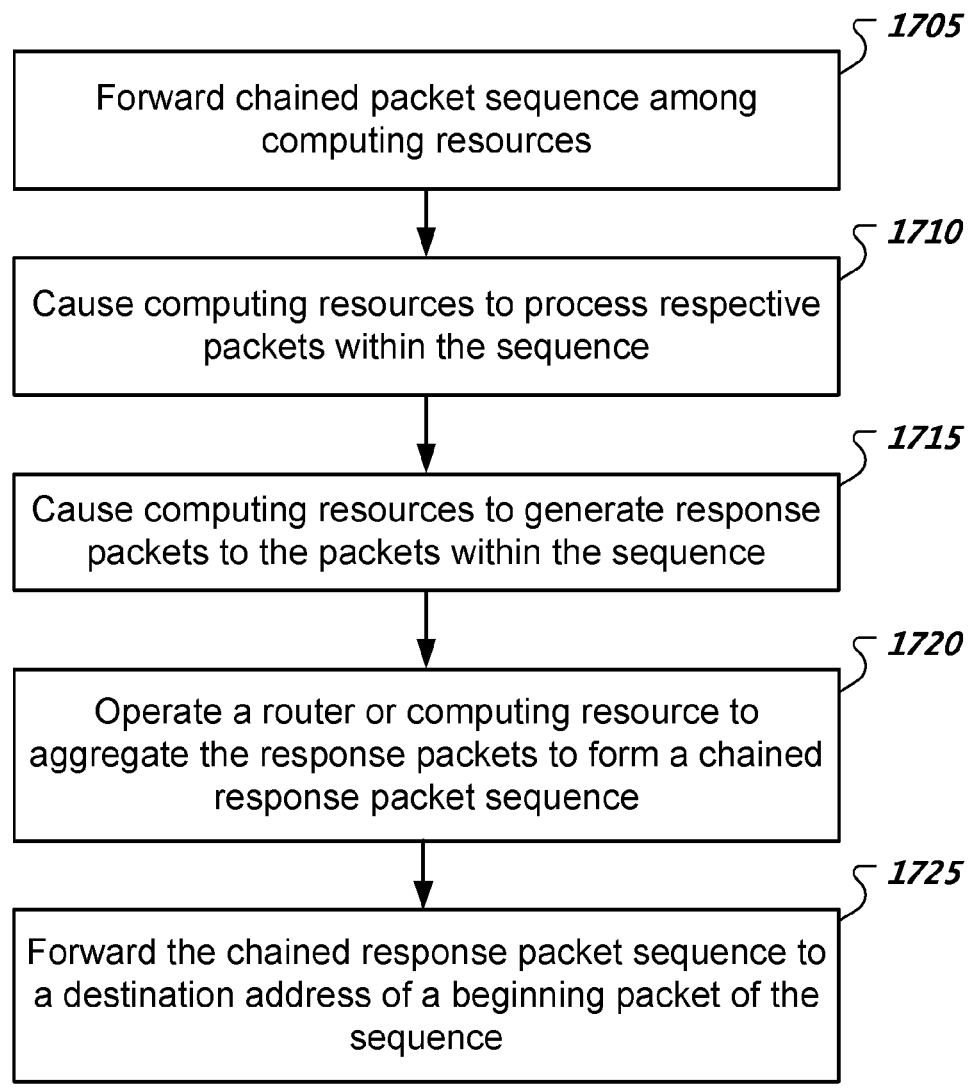
FIG. 17 shows a flow diagram of another example of a process of handling of a chained packet sequence within a computer system.

FIG. 17 shows a flow diagram of another example of a process of handling of a chained packet sequence within a computer system. At 1705, the process forwards a chained packet sequence among computing resources. At 1710, the process causes computing resources to process respective packets within the sequence. The forwarding and the processing of packets within the sequence can be interleaved. At 1715, the process causes computing resources to generate response packets to the packets within the sequence. At 1720, the process operates a router or computing resource to aggregate the response packets to form a chained response packet sequence. In some implementations, the process can order packets within the chained response packet sequence based on a shortest route among all of the destination addresses specified by the packets of the chained response packet sequence. At 1725, the process forwards the chained response packet sequence to a destination address of a beginning packet of the sequence. The process can continue to forward the remaining portion of the chained response packet sequence as needed.

In the above description, numerous specific details have been set forth in order to provide a thorough understanding of the disclosed technologies. In other instances, well known structures, interfaces, and processes have not been shown in detail in order to avoid unnecessarily obscuring the disclosed technologies. However, it will be apparent to one of ordinary skill in the art that those specific details disclosed herein need not be used to practice the disclosed technologies and do not represent a limitation on the scope of the disclosed technologies, except as recited in the claims. It is intended that no part of this specification be construed to effect a disavowal of any part of the full scope of the disclosed technologies. Although certain embodiments of the present disclosure have been described, these embodiments likewise are not intended to limit the full scope of the disclosed technologies.

While specific embodiments and applications of the disclosed technologies have been illustrated and described, it is to be understood that the disclosed technologies are not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the disclosed technologies disclosed herein without departing from the spirit and scope of the disclosed technologies. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of hardware processors, e.g., microprocessors, microcontrollers, field programmable gate arrays (FPGAs), application specific integrated circuits (ASICs), and/or System on a Chip (SoC)—but such implementation decisions should not be interpreted as causing a departure from the scope of the disclosed technologies.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the disclosed technologies. In other words, unless a specific order of steps or actions is required for proper operation of the embodiment, the order and/or use of specific steps and/or actions may be modified without departing from the scope of the disclosed technologies.

What is claimed is:

1. A method comprising:

generating, at a first computing resource of a computer system, a chained packet sequence, wherein each packet in the chained packet sequence specifies (i) a chain indicator to indicate inclusion in the chained packet sequence, (ii) a destination address, and (iii) an opcode that specifies an operation to be performed by a computing resource associated with the destination address;

routing, at a router of the computer system, the chained packet sequence to a second computing resource based on the destination address of a first chained packet in the chained packet sequence, the destination address of the first chained packet being associated with the second computing resource;

receiving, at the second computing resource of the computer system, the chained packet sequence;

performing, at the second computing resource, the operation specified by the opcode of the first chained packet; and determining, at the second computing resource, whether to process at the second computing resource or forward to a third computing resource of the computer system one or more chained packets in a remainder portion of the chained packet sequence based on the destination address of a second chained packet of the chained packet sequence, wherein the second chained packet is located at a beginning of the remainder portion.

2. The method of claim 1, wherein the chain indicator comprises a bit field to indicate whether a subsequent packet is part of the chained packet sequence.

3. The method of claim 1, wherein the chain indicator comprises a chain length field to indicate a length of the chained packet sequence.

4. The method of claim 3, wherein the indicated length corresponds to a quantity of packets in the chained packet sequence.

5. The method of claim 1, wherein at least one packet of the chained packet sequence comprises a barrier indicator to indicate whether processing of one or more packets in the chained packet sequence is to be completed before processing a subsequent portion of the chained packet sequence.

6. The method of claim 1, wherein the first chained packet comprises data, and wherein the opcode of the first chained packet specifies a write of the data to memory associated with the second computing resource.

7. The method of claim 6, wherein the second chained packet is configured to notify a notification target computing resource of the computer system about a completion of the write of the data.

8. The method of claim 1, wherein the opcode of the first chained packet specifies a read of first data from a first memory of the computer system based on a first memory address, and wherein the opcode of the second chained packet specifies a read of second data from a second memory of the computer system based on a second memory address.

9. The method of claim 8, wherein the first memory address forms a portion of the destination address of the first chained packet, and wherein the second memory address forms a portion of the destination address of the second chained packet.

10. The method of claim 8, comprising:

generating a first response packet based on the first data;
generating a second response packet based on the second data;
generating a chained sequence of response packets that comprise the first response packet and the second response packet; and
sending the chained sequence of response packets to a destination computing resource of the computer system.

11. An apparatus comprising:

a first computing resource;
a second computing resource;
a router to communicatively couple the first computing resource and the second computing resource; and
a third computing resource,
wherein the first computing resource is configured to generate a chained packet sequence, wherein each packet in the chained packet sequence specifies (i) a chain indicator to indicate inclusion in the chained packet sequence, (ii) a destination address, and (iii) an opcode that specifies an operation to be performed by a computing resource associated with the destination address,
wherein the router is configured to route the chained packet sequence to the second computing resource based on the destination address of a first chained packet in the chained packet sequence, the destination address of the first chained packet being associated with the second computing resource,
wherein the second computing resource is configured to receive the chained packet sequence, perform the operation specified by the opcode of the first chained packet, and determine whether to process at the second computing resource or forward to the third computing resource one or more chained packets in a remainder portion of the chained packet sequence based on the destination address of a second chained packet of the chained packet sequence, and wherein the second chained packet is located at a beginning of the remainder portion.

12. The apparatus of claim 11, wherein the chain indicator comprises a bit field to indicate whether a subsequent packet is part of the chained packet sequence.

13. The apparatus of claim 11, wherein the chain indicator comprises a chain length field to indicate a length of the chained packet sequence.

14. The apparatus of claim 13, wherein the indicated length corresponds to a quantity of packets in the chained packet sequence.

15. The apparatus of claim 11, wherein at least one packet of the chained packet sequence comprises a barrier indicator to indicate whether processing of one or more packets in the chained packet sequence is to be completed before processing a subsequent portion of the chained packet sequence.

16. The apparatus of claim 11, wherein the first chained packet comprises data, and wherein the opcode of the first chained packet specifies a write of the data to memory associated with the second computing resource.

17. The apparatus of claim 16, wherein the second chained packet is configured to notify a notification target computing resource of the apparatus about a completion of the write of the data.

18. The apparatus of claim 11, wherein the opcode of the first chained packet specifies a read of first data from a first memory of the apparatus based on a first memory address, and wherein the opcode of the second chained packet specifies a read of second data from a second memory of the apparatus based on a second memory address.

19. The apparatus of claim 18, wherein the first memory address forms a portion of the destination address of the first chained packet, and wherein the second memory address forms a portion of the destination address of the second chained packet.

20. The apparatus of claim 18, comprising a computing resource configured to
   generate a first response packet based on the first data,
   generate a second response packet based on the second data,
   generate a chained sequence of response packets that comprise the first response packet and the second response packet, and
   send the chained sequence of response packets to a destination computing resource of the apparatus.

21. A system comprising:
   a plurality of computing resources;
   a plurality of memories associated with respective ones of the computing resources; and
   a router to communicatively couple at least a portion of the computing resources,
   wherein the router is configured to receive a chained packet sequence from a first computing resource of the computing resources, wherein the chained packet sequence includes at least one chain indicator to identify packets belonging in the chained packet sequence, wherein each packet in the chained packet sequence specifies (i) a destination address, and (ii) an opcode that specifies an operation to be performed by a computing resource associated with the destination address,
   wherein the router is configured to route the chained packet sequence to a second computing resource of the computing resources based on the destination address of a first chained packet in the chained packet sequence, the destination address of the first chained packet being associated with the second computing resource,
   wherein the second computing resource is configured to receive the chained packet sequence, perform the operation specified by the opcode of the first chained packet, and determine whether to process at the second computing resource or forward to a third computing resource of the computing resources one or more chained packets in a remainder portion of the chained packet sequence based on the destination address of a second chained packet of the chained packet sequence, and wherein the second chained packet is located at a beginning of the remainder portion.

22. The system of claim 21, wherein the chain indicator comprises a chain length field to indicate a length of the chained packet sequence.

23. The system of claim 21, wherein the opcode of the first chained packet specifies a read of first data from a first memory of the memories based on a first memory address, wherein the opcode of the second chained packet specifies a read of second data from a second memory of the memories based on a second memory address, wherein the first memory address forms a portion of the destination address of the first chained packet, and wherein the second memory address forms a portion of the destination address of the second chained packet.

24. The system of claim 21, wherein the first chained packet comprises data, and wherein the opcode of the first chained packet specifies a write of the data to memory associated with the second computing resource.

25. The system of claim 24, wherein the second chained packet is configured to notify a notification target computing resource of the system about a completion of the write of the data.

* * * * *